United States Patent
Hiramatsu et al.

(10) Patent No.: US 12,537,145 B2
(45) Date of Patent: Jan. 27, 2026

(54) CATHODE CURRENT COLLECTOR WITH AN ORGANIC CONDUCTIVE LAYER AND ELECTROLYTIC CAPACITOR INCLUDING SUCH A CATHODE CURRENT COLLECTOR

(71) Applicant: JAPAN CAPACITOR INDUSTRIAL CO., LTD, Tokyo (JP)

(72) Inventors: Hiromi Hiramatsu, Tokyo (JP); Kentaro Shimojo, Tokyo (JP)

(73) Assignee: Japan Capacitor Industrial Co., Ltd., Tokyo (JP)

( * ) Notice: Subject to any disclaimer, the term of this patent is extended or adjusted under 35 U.S.C. 154(b) by 132 days.

(21) Appl. No.: 18/478,216

(22) Filed: Sep. 29, 2023

(65) Prior Publication Data
US 2024/0274370 A1     Aug. 15, 2024

Related U.S. Application Data

(63) Continuation-in-part of application No. PCT/JP2023/004853, filed on Feb. 13, 2023.

(51) Int. Cl.
| | |
|---|---|
| H01G 9/15 | (2006.01) |
| H01G 9/028 | (2006.01) |
| H01G 9/042 | (2006.01) |

(52) U.S. Cl.
CPC .............. *H01G 9/15* (2013.01); *H01G 9/028* (2013.01); *H01G 9/0425* (2013.01)

(58) Field of Classification Search
CPC ......... H01G 9/15; H01G 9/0425; H01G 9/028
See application file for complete search history.

(56) References Cited

U.S. PATENT DOCUMENTS

| | | | |
|---|---|---|---|
| 2011/0122547 A1 | 5/2011 | Fujimoto | |
| 2012/0328929 A1* | 12/2012 | Matsumoto | H01M 10/0525 427/79 |
| 2015/0255220 A1 | 9/2015 | Komatsu et al. | |

(Continued)

FOREIGN PATENT DOCUMENTS

| | | |
|---|---|---|
| JP | H07-283086 | 10/1995 |
| JP | 2011-114132 | 6/2011 |

(Continued)

OTHER PUBLICATIONS

Office Action and Search Report (with partial English-language translation), counterpart Taiwanese App. No. 112130063 (Jul. 11, 2024) (15 pages).

*Primary Examiner* — David M Sinclair
(74) *Attorney, Agent, or Firm* — Cook Alex Ltd.

(57) ABSTRACT

The cathode current collector includes: a cathode substrate; an oxide layer being provided on a surface of the cathode substrate; and an organic conductive layer being provided on a surface of the oxide layer, wherein the organic conductive layer consists of a dense layer provided on the surface of the oxide layer and a porous layer provided on a surface of the dense layer, or consists of a dense layer provided on the surface of the oxide layer, and the organic conductive layer has a thickness of more than 2 μm and less than or equal to 22 μm. Also, the organic conductive layer in the electrolytic capacitor is provided in close contact with the surface of the oxide layer, and the thickness of the organic conductive layer is more than 2 μm and less than or equal to 22 μm.

20 Claims, 2 Drawing Sheets

(56) References Cited

U.S. PATENT DOCUMENTS

| | | | |
|---|---|---|---|
| 2015/0255222 A1* | 9/2015 | Machida | H01G 9/035 |
| | | | 252/62.2 |
| 2018/0047511 A1 | 2/2018 | Tsuda | |
| 2022/0376220 A1 | 11/2022 | Brewer et al. | |
| 2023/0017930 A1 | 1/2023 | Koseki et al. | |
| 2023/0411085 A1* | 12/2023 | Aoyama | H01G 9/145 |

FOREIGN PATENT DOCUMENTS

| | | |
|---|---|---|
| JP | WO2016/174806 | 2/2018 |
| TW | 202143266 | 11/2021 |
| WO | WO2014/050913 | 4/2014 |
| WO | WO2021/125182 | 6/2021 |

* cited by examiner

CATHODE CURRENT COLLECTOR WITH AN ORGANIC CONDUCTIVE LAYER AND ELECTROLYTIC CAPACITOR INCLUDING SUCH A CATHODE CURRENT COLLECTOR

FIELD OF THE INVENTION

The present invention relates to a cathode current collector and an electrolytic capacitor.

BACKGROUND OF THE INVENTION

In recent years, as electronic devices have become smaller and faster, in the field of electrolytic capacitors using solid electrolytes, there has been a strong need for capacitors that are compact, have large capacitance, and have low equivalent series resistance (hereinafter referred to as "ESR") in a high frequency range. The electrolytic capacitor using the solid electrolyte employs a cathode current collector including: a cathode substrate made of a valve metal; an oxide layer made of an oxide of the valve metal, the oxide layer being arranged on a surface of the cathode substrate; and optionally an inorganic conductive layer including an inorganic conductive material on the surface. The surface of the cathode current collector has a contact resistance with electrolyte components, and this contact resistance has an extremely large effect on the ESR of the capacitor.

In general, dispersion solutions containing dispersions of conductive polymers are often used to form solid electrolyte layers. The dispersion solutions may cause problems that, especially, an adhesion of the solid electrolyte layer to the cathode current collector is decreased, resulting in an increased contact resistance. In particular, in hybrid electrolytic capacitors, the solid electrolyte layers formed with the dispersion solutions tend to retain the electrolytic solutions, so that the electrolytic solution penetrates between the solid electrolyte layer and the cathode current collector, resulting in decreased adhesion and increased contact resistance.

For example, for a cathode current collector having an inorganic conductive layer on a surface of the cathode substrate, Patent Literature 1 proposes to improve an adhesion of the solid electrolyte layer to the cathode current collector by roughening the surface of the cathode substrate before applying the inorganic conductive layer. Irregularities are also formed on the inorganic conductive layer surface along the roughened structure formed on the surface of the cathode substrate. The concave regions on the surface of the inorganic conductive layer are not in contact with the solid electrolyte layer. An electrolytic solution used as the electrolyte in the capacitor is guided to these concave regions on the surface of the inorganic conductive layer, thereby improving the adhesion of the solid electrolyte layer to the cathode current collector. A hybrid electrolytic capacitor obtained by using such a cathode current collector has a decreased initial ESR, and a suppressed increase in ESR after a non-loaded test.

For example, for a cathode current collector having an oxide layer and an inorganic conductive layer in this order on a surface of the cathode substrate, Patent Literature 2 proposes to improve the adhesion of the solid electrolyte layer to the cathode current collector by further providing an organic conductive layer on the surface of the inorganic conductive layer. By providing the organic conductive layer having a low electrolytic solution impregnation property on the surface of the inorganic conductive layer, most of the electrolytic solution used as the electrolyte in the capacitor is retained in the solid electrolyte layer. This improves the adhesion of the solid electrolyte layer to the cathode current collector. The hybrid electrolytic capacitor obtained by using such a cathode current collector has a lower initial ESR, and a suppressed increase in ESR after a load test.

For example, Patent Literature 3 proposes a solid electrolytic capacitor that achieves a reduced impedance in a high frequency range by using a conductive separator and a further reduced impedance by forming an organic conductive layer on the surface of the cathode current collector.

CITATION LIST

Patent Literatures

[Patent Literature 1] WO 2016/174806 A1
[Patent Literature 2] WO 2021/125182 A1
[Patent Literature 3] Japanese Patent Application Publication No. H07-283086 A

SUMMARY OF THE INVENTION

As shown in Patent Literature 1, it is possible to improve the adhesion to the solid electrolyte layer to some extent by using the cathode current collector having the inorganic conductive layer on the roughened cathode substrate. However, even if the electrolytic solution is guided to the concave regions on the surface of the inorganic conductive layer where the solid electrolyte layer is not in contact with the inorganic conductive layer, the solid electrolyte layer formed with the dispersion solution easily retains the electrolytic solution as described in Patent Literature 1. Therefore, the problem of electrolytic solution penetration between the solid electrolyte layer and the cathode current collector resulting in deteriorated adhesion would not be fundamentally improved.

The adhesion of the solid electrolyte layer to the cathode current collector is improved to some extent by adding an organic conductive layer to the surface of the inorganic conductive layer as disclosed in Patent Literature 2. However, as a result of intensive studies, the present inventors have found that further improvement of the property is possible by further modifying the structure of the organic conductive layer to make it more suitable. That is, Patent Literature 2 teaches that the organic conductive layer should be dense such that the density is in the predetermined range. However, even if such a combination of the dense organic conductive layer and the solid electrolyte layer that can easily retain the electrolytic solution is used, the electrolytic solution permeates into an interface between the cathode current collector and the solid electrolyte layer, resulting in reduced adhesion of the solid electrolyte layer to the cathode current collector, which may not sufficiently solve the problem of contact resistance. This penetration of the electrolytic solution into the interface between the cathode current collector and the solid electrolyte layer degrades the high reliability, especially for long life. Patent Literature 2 also teaches that the thickness of the organic conductive layer is generally 1 to 2,000 nm. However, such a thin organic conductive layer alone does not sufficiently prevent the electrolytic solution from penetrating into the interface between the inorganic conductive layer and the organic conductive layer, resulting in poor adhesion of the organic conductive layer to the inorganic conductive layer. This penetration of the electrolytic solution into the interface between the inorganic conductive layer and the organic conductive layer deteriorates the ESR, especially at the initial stage. Therefore, in Patent Document 2, neither the adhesion of the solid electrolyte layer to the cathode current collector nor the adhesion of the organic conductive layer to the inorganic conductive layer in the cathode current collector can be sufficient, and the initial ESR and high reliability for long life are insufficient.

Both Patent Literatures 1 and 2 relate to the hybrid electrolytic capacitors that use both the solid electrolyte and the electrolytic solution as electrolyte components, but the adhesion of the solid electrolyte layer to the cathode current collector is also problematic in solid electrolytic capacitors that do not use the electrolytic solution as the electrolyte component in the capacitor. For example, Patent Literature 3 discloses that the organic conductive layer formed on the surface of the cathode current collector produces an effect of reducing impedance, but it does not mention any specific structure of the organic conductive layer at that time. However, as a result of intensive studies as described above, the present inventors have found that the characteristics can be further improved by further modifying the structure of the organic conductive layer to a more suitable one.

The prior arts described above have the problems of contact resistance, i.e. (1) there is room for improvement in a rate of change of the ESR over time due to the deterioration of the adhesion of the solid electrolyte layer to the cathode current collector, and (2) there is room for improvement in the initial ESR value due to the deterioration of the adhesion in the cathode current collector (the adhesion of the organic conductive layer to the oxide layer provided on the surface of the cathode substrate, or the adhesion of the organic conductive layer to the inorganic conductive layer provided on the surface of the oxide layer).

The solid electrolyte layers used in the electrolytic capacitors having the cathode current collectors formed using the cathode substrate made of the valve metal includes those formed by chemical polymerization using a monomer(s) and an oxidizing agent, in addition to those formed using a dispersion solution containing a dispersion of conductive polymer particles and a dispersing medium. The chemical polymerization causes a problem that the surface of the cathode current collector becomes acidic and damaged during the chemical polymerization of the monomer(s) and oxidizing agent.

Therefore, one of objects of the present invention is to provide a cathode current collector and an electrolytic capacitor, which can improve at least one of the above problems of contact resistance and surface damage to the cathode current collector.

The cathode current collector provided by a first aspect according to the present invention is a cathode current collector comprising: a cathode substrate made of a valve metal; an oxide layer made of an oxide of the valve metal, the oxide layer being provided on a surface of the cathode substrate; and an organic conductive layer comprising a conductive polymer, the organic conductive layer being provided on a surface of the oxide layer, wherein the organic conductive layer consists of a dense layer provided on the surface of the oxide layer and a porous layer provided on a surface of the dense layer.

The cathode current collector provided by a second aspect according to the present invention is a cathode current collector comprising: a cathode substrate made of a valve metal; an oxide layer made of an oxide of the valve metal, the oxide layer being provided on a surface of the cathode substrate; and an organic conductive layer comprising a conductive polymer, the organic conductive layer being provided on a surface of the oxide layer, wherein the organic conductive layer consists of a dense layer provided on the surface of the oxide layer, and the organic conductive layer has a thickness of more than 2 µm and less than or equal to 22 µm.

In the cathode current collector provided by the first and second aspects according to the present invention, an inorganic conductive layer comprising an inorganic conductive material may further be provided between the oxide layer and the organic conductive layer, and the dense layer may be provided on a surface of the inorganic conductive layer.

In the cathode current collector provided by the first and second aspects according to the present invention, the surface of the cathode substrate may be smooth.

In the cathode current collector provided by the first aspect according to the present invention, the thickness of the porous layer may be more than or equal to 2 µm and less than or equal to 25 µm.

In the cathode current collector provided by the first aspect according to the present invention, the dense layer may have a thickness of more than or equal to 0.02 µm and less than 15 µm.

In the cathode current collector provided by the first aspect according to the present invention, the porous layer may have a porosity of more than or equal to 0.1 and less than or equal to 0.7.

In the cathode current collector provided by the first and second aspects according to the present invention, the organic conductive layer may be an electrolytically polymerized film and the conductive polymer may be poly(3,4-ethylenedioxythiophene).

The electrolytic capacitor provided by a third aspect according to the present invention comprises at least a solid electrolyte as an electrolyte component and uses the cathode current collector provided by the present invention.

The electrolytic capacitor provided by a fourth aspect according to the present invention is an electrolytic capacitor comprising: a cathode current collector having a cathode substrate made of a valve metal, an oxide layer made of an oxide of the valve metal, the oxide layer being provided on a surface of the cathode substrate, and an organic conductive layer comprising a conductive polymer, the organic conductive layer being provided on a surface of the oxide layer; and at least a solid electrolyte as an electrolyte component, wherein the organic conductive layer is provided in close contact with the surface of the oxide layer, and the organic conductive layer has a thickness of more than 2 µm and less than or equal to 22 µm.

In the electrolytic capacitor provided by the fourth aspect according to the present invention, the organic conductive layer may consist of a dense layer provided on the surface of the oxide layer and a porous layer provided on a surface of the dense layer, or consist of a dense layer provided on the surface of the oxide layer.

In the electrolytic capacitor provided by the fourth aspect according to the present invention, an inorganic conductive layer comprising an inorganic conductive material may further be provided between the oxide layer and the organic conductive layer, and the organic conductive layer may be provided in close contact with a surface of the inorganic conductive layer.

In the electrolytic capacitor provided by the fourth aspect according to the present invention, the surface of the cathode substrate may be smooth.

In the electrolytic capacitor provided by the fourth aspect according to the present invention, the organic conductive layer may be an electrolytically polymerized film and the conductive polymer may be poly(3,4-ethylenedioxythiophene).

The electrolytic capacitor provided by the third and fourth aspects according to the present invention may further comprise an electrolytic solution as an electrolyte component.

The cathode current collector and the electrolytic capacitor according to each aspect of the present invention can improve at least one of the contact resistance problems of the prior arts. In particular, the cathode current collector and the electrolytic capacitor according to each aspect of the present invention can achieve a low ESR and a high durability in a high frequency range. Here, the high frequency is not clearly defined and it indicates a frequency range that varies depending on the field of application, but in the electrical field, the high frequency may indicate a frequency range from several kHz to several tens of MHz. Although not limited, in the field of certain capacitors, the high frequency may indicate a frequency range from several kHz to several hundred kHz. Each aspect of the present invention is particularly effective when using solid electrolyte layers with dispersion solutions, but is also effective when using solid electrolyte layers with chemical polymerization. In other words, the cathode current collector and the electrolytic capacitor according to each aspect of the present invention can suppress damage to the surface of the cathode current collector during chemical polymerization by forming the organic conductive layer on the surface of the cathode current collector, the organic conductive layer preventing penetration of the polymerization solution such as monomers and oxidizing agents, so that they can achieve the low ESR and the high durability.

DETAILED DESCRIPTION OF THE INVENTION

The cathode current collector and the electrolytic capacitor according to the present invention will be described below with reference to the drawings. The drawings are used to illustrate the present invention, and the invention is not limited to the contents of the drawings. Furthermore, all the embodiments and examples disclosed herein are illustrative, and the scope of the invention is not limited to their contents. The scope of the invention includes all modifications equivalent to and within the scope of the claims.

1. Cathode Current Collectors 7, 8 and 10

Figure 1:
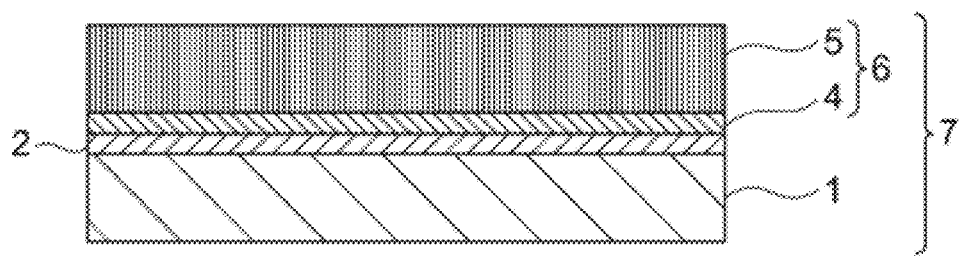
FIG. 1 is a cross-sectional view showing a layer structure of a cathode current collector, which is an embodiment of a first aspect according to the present invention.

An embodiment of a cathode current collector according to a first aspect of the invention is schematically shown in FIG. 1. A cathode current collector 7 is a cathode current collector including: a cathode substrate 1 made of a valve metal; an oxide layer 2 made of an oxide of the valve metal making up the cathode substrate 1, the oxide layer 2 being provided on a surface of the cathode substrate 1; and an organic conductive layer 6 including a conductive polymer, the organic conductive layer 6 being provided on a surface of the oxide layer 2, wherein the organic conductive layer 6 consists of a dense layer 4 provided on the surface of the oxide layer 2, and a porous layer 5 provided on the surface of the dense layer 4. The porous layer 5 is a layer in which a number of voids are observed in a thickness direction. The dense layer 4 is a dense layer having fewer pores than the porous layer 5. The dense layer 4 is a layer having substantially no pore. The specific compositions and presence/absence determination of the dense layer 4 and the porous layer 5 will be described in detail later.

Here, by providing the dense layer 4 on the surface of the oxide layer 2 with which the organic conductive layer 6 is contacted, the adhesion of the organic conductive layer 6 to the oxide layer 2 can be ensured. This is because the dense layer 4 has a feature of continuously existing between it and the oxide layer 2, which allows more contact points between the oxide layer 2 and the organic conductive layer 6 (dense layer 4) and can reduce a space for substances that will deteriorate the adhesion to penetrate between the oxide layer 2 and the organic conductive layer 6. Further, by ensuring the adhesion of the organic conductive layer 6 to the oxide layer 2, the contact resistance can be decreased and the initial ESR value can be reduced.

The porous layer 5 is provided on the surface of the dense layer 4, i.e., on a portion on a side where the organic conductive layer 6 is in contact with the solid electrolyte layer, so that the adhesion of the solid electrolyte layer to the organic conductive layer 6 can be ensured. This would be due to an anchoring effect in which a dispersion solution of the conductive polymer enters the porous layer 5 during the formation of the solid electrolyte layer, and the organic conductive layer 6 and the solid electrolyte layer are integrated with each other. By ensuring the adhesion of the solid electrolyte layer to the organic conductive layer 6, an increase in contact resistance due to peeling of the solid electrolyte layer can be suppressed, and the adhesion of the solid electrolyte layer to the cathode current collector 7 can be made sufficient to reduce a rate of change of the ESR over time.

Figure 2:
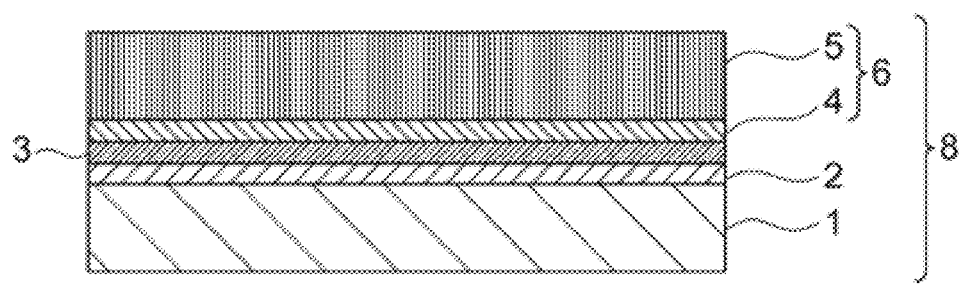
FIG. 2 is a cross-sectional view showing a layer structure of a cathode current collector, which is another embodiment of the first aspect according to the present invention.
Figure 5:
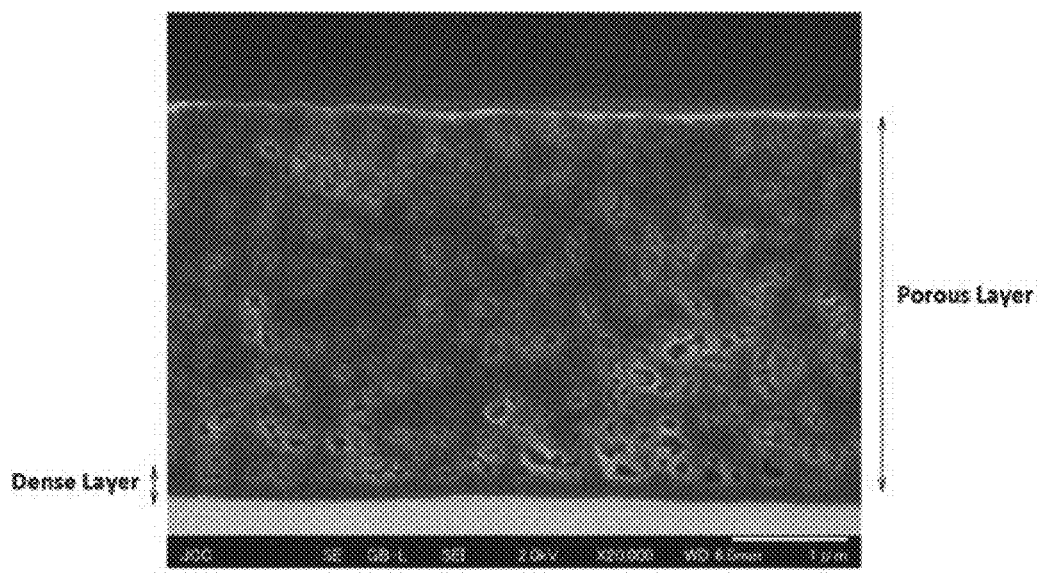
FIG. 5 is a cross-sectional photograph enlarging a portion of an organic conductive layer of a cathode current collector which is another embodiment of the first aspect according to the present invention.

Another embodiment of the cathode current collector according to the first aspect of the invention is schematically shown in FIG. 2. A photograph of its cross section is also shown in FIG. 5. A cathode current collector 8 is a cathode current collector including: a cathode substrate 1 made of a valve metal; an oxide layer 2 made of an oxide of the valve metal making up the cathode substrate 1, the oxide layer 2 being provided on the surface of the cathode substrate 1; an inorganic conductive layer 3 provided on a surface of the oxide layer 2; and an organic conductive layer 6 containing a conductive polymer, the organic conductive layer 6 being provided on a surface of the inorganic conductive layer 3, wherein the organic conductive layer 6 has a dense layer 4 provided on the surface of the oxide layer 2, and a porous layer 5 provided on the surface of the dense layer 4.

Here, by providing the dense layer 4 on the surface of the inorganic conductive layer 3 with which the organic conductive layer 6 is contacted, the adhesion of the organic conductive layer 6 to the inorganic conductive layer 3 can be ensured. This is because, as described above, the dense layer 4 has the feature of continuously existing between it and the inorganic conductive layer 3, which allows more contact points between the inorganic conductive layer 3 and the organic conductive layer 6 (dense layer 4), and can reduce the space for substances that will deteriorate the adhesion to penetrate between the inorganic conductive layer 3 and the organic conductive layer 6. By ensuring the adhesion of the organic conductive layer 6 to the inorganic conductive layer 3, the contact resistance can be decreased and the initial value of the ESR can be reduced.

By providing the porous layer 5 on the surface of the dense layer 4, i.e., on the side where the organic conductive layer 6 is in contact with the solid electrolyte layer, the adhesion of the solid electrolyte layer to the organic conductive layer 6 can be ensured. This is also due to the anchoring effect as described above, and by ensuring the sufficient adhesion of the solid electrolyte layer to the cathode current collector 8, the rate of change of the ESR over time can be reduced.

In general, when using a solid electrolyte layer with a conductive polymer dispersion, a problem of contact resistance may occur due to a deteriorated adhesion of the solid electrolyte layer to the cathode current collector and/or a deteriorated adhesion in the cathode current collector. In contrast, in the cathode current collectors 7 and 8 according to the embodiments of the present invention, the problem of contact resistance can be at least partially improved by providing the organic conductive layer 6 consisting of a multilayer structure having the dense layer 4 and the porous layer 5 so as to have structures suitable for the respective interfaces. More particularly, by providing the dense layer 4 on the surface of the oxide layer 2 or the inorganic conductive layer 3, the adhesion in the cathode current collector (the adhesion of the organic conductive layer to the oxide layer on the surface of the cathode substrate or the adhesion of the organic conductive layer to the inorganic conductive layer provided on the surface of the oxide layer) can be improved and the initial ESR value can be reduced. Furthermore, by providing the porous layer 5 on the surface of the dense layer 4, the adhesion of the solid electrolyte layer to the cathode current collector can be improved and the rate of change of the ESR over time can be reduced.

Figure 3:
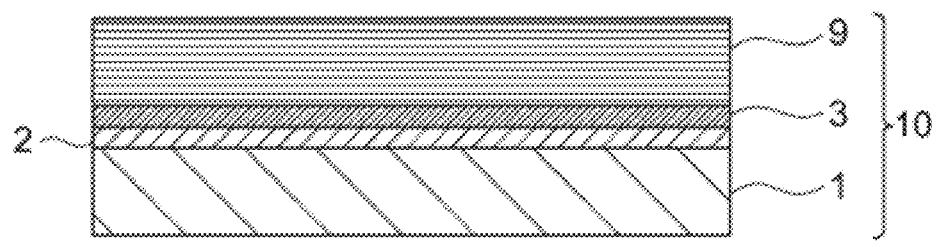
FIG. 3 is a cross-sectional view showing a layer structure of a cathode current collector, which is an embodiment of a second aspect according to the present invention.

FIG. 3 schematically shows an embodiment of a cathode current collector according to the second aspect of the present invention. A cathode current collector 10 is a cathode current collector including: a cathode substrate 1 made of a valve metal; an oxide layer 2 made of an oxide of the valve metal making up the cathode substrate 1, the oxide layer 2 being provided on a surface of the cathode substrate 1; an inorganic conductive layer 3 provided on a surface of the oxide layer 2; and an organic conductive layer 9 containing a conductive polymer, the organic conductive layer 9 being provided on a surface of the inorganic conductive layer 3, wherein the organic conductive layer 9 consists of a dense layer provided on the surface of the inorganic conductive layer 3, and the organic conductive layer 9 has a thickness of more than 2 µm and less than or equal to 22 µm.

Here, by providing the dense layer as the organic conductive layer 9 on the surface of the inorganic conductive layer 3 with which the organic conductive layer 9 is contacted, it is possible to prevent the dispersion solution of the conductive polymer from penetrating into the interface between the inorganic conductive layer 3 and the organic conductive layer 9. Further, the thickness of the organic conductive layer 9 of more than 2 µm allows the electrolytic solution to be sufficiently prevented from penetrating into the interface between the inorganic conductive layer 3 and the organic conductive layer 9, thereby ensuring the adhesion, sufficiently reducing the initial ESR value, and solving the problems of contact resistance. On the other hand, the thickness of the organic conductive layer 9 of less than or equal to 22 µm can suppress an increase in the ESR due to an increased distance between the capacitor electrodes.

Although the inorganic conductive layer 3 is also provided in FIG. 3, the present invention also includes a cathode current collector without the inorganic conductive layer 3 in FIG. 3. In this case, the relationship between the inorganic conductive layer 3 and the organic conductive layer 9 is replaced by the relationship between the oxide layer 2 and the organic conductive layer 9. That is, when the inorganic conductive layer 3 is not provided, the organic conductive layer 9 (dense layer) is provided on the surface of the oxide layer 2.

(1) Regarding Cathode Substrate 1

As a cathode substrate 1, a substrate made of a valve metal used as a cathode substrate in conventional electrolytic capacitors can be used without any particular limitation. For example, foils made of the valve metals such as aluminum, tantalum, niobium, and titanium can be used as the cathode substrate 1, and aluminum foils are particularly preferred. As used herein, the term "foil" can refer to a sheet-shaped member having a thickness of 200 µm or less, although not limited thereto.

The cathode substrate 1 may be subjected to a roughening treatment such as etching, and may be smooth without the roughening treatment. When etching is performed as the roughening treatment, it can be a known chemical etching method or a known electrolytic etching method. Pits formed by etching can be tunnel pits, sponge-like pits, or a combination of both.

However, if a roughened cathode substrate is used, residues of the electrolytic solution during the electrolytic polymerization tend to remain in the etched structure, whereas if the cathode substrate is smooth, the residues tend to be removed by washing and difficult to remain. The smooth cathode substrate is preferred because the residues lead to performance degradation.

The "smooth" as used herein refers to a surface condition where no roughening treatment such as etching has been performed as described as an example, and the surface may be completely flat, but it is not necessarily completely flat. The term "smooth" includes a case where minute roughness or waviness is present on the surface due to unavoidable rolling striations or scarring that slightly occurs in the foil production such as rolling. The degree of waviness such as unavoidable rolling striations may depend on a finishing roller used in a final rolling step.

(2) Regarding Oxide Film 2

The oxide film 2 provided on the surface of the cathode substrate 1 may be an anodic oxide film or a naturally oxidized film. If the oxide film 2 is the anodic oxide film, it may be a barrier type film or a porous type film. A known anodization method can be used as the forming method. For example, it may be a chemical conversion treatment using a chemical conversion solution such as an ammonium borate solution, an ammonium adipate solution, and an ammonium phosphate solution.

(3) Regarding Inorganic Conductive Layer 3

Whether or not the inorganic conductive layer 3 is provided between the oxide layer 2 and the organic conductive layer 6 can optionally be selected, depending on the structure of the capacitor to be finally obtained. For example, in conventional solid electrolytic capacitors, a cathode current collector having an inorganic conductive layer 3 formed as the outermost layer is often used. On the other hand, for conventional hybrid electrolytic capacitors, there are cases where a cathode current collector having an oxide layer (including an oxide of a valve metal making up the cathode substrate) formed as the outermost layer is used, and where a cathode current collector having an inorganic conductive layer formed as the outermost layer is used. Therefore, for the cathode current collector according to the present invention, whether or not the inorganic conductive layer is provided can optionally be selected.

The dense layer 4 according to the present invention has a higher adhesion not only to the oxide layer 2, but also to the inorganic conductive layer 3. Therefore, the provision of the dense layer 4 can improve an adhesion of the organic conductive layer 6 to a layer on the side of the cathode substrate 1 (hereinafter, the layer means the oxide layer 2 if the inorganic conductive layer 3 is not provided, and the inorganic conductive layer 3 if the inorganic conductive layer 3 is provided), regardless of whether or not the inorganic conductive layer 3 is provided, and the effect of the present invention can be obtained.

The inorganic conductive layer 3 may be one layer, or two or more inorganic conductive layers may be formed using different inorganic conductive materials.

Types of the inorganic conductive materials forming the inorganic conductive layer 3 or the method of forming the inorganic conductive layer 3 are not particularly limited as long as they ensure sufficient adhesion to the oxide layer in the cathode current collector or allow the ions of the inorganic conductive materials to penetrate the oxide layer and to firmly adhere to the cathode substrate 1.

Examples of the inorganic conductive materials that can be used herein include carbon, titanium, aluminum, tantalum, chromium, niobium, vanadium, tungsten, hafnium, copper, platinum, gold, silver, cobalt, nickel, and iron. Also, examples of the forming method include vacuum deposition, sputtering, ion plating, CVD (chemical vapor deposition), ALD (atomic layer deposition), application, electrolytic plating, and electroless plating.

(4) Regarding Organic Conductive Layer (4-1) Regarding Organic Conductive Layer 6

The organic conductive layer 6 in the cathode current collectors 7 and 8 consists of the dense layer 4 provided on the surface of the layer on the side of the cathode substrate 1, and a porous layer 5 provided on the surface of the dense layer 4 which will be in contact with the solid electrolyte layer. The porous layer 5 may have a multi-layer structure consisting of a plurality of porous layers, wherein adjacent layers have different porosities.

For the side of the cathode substrate 1, it is desirable to increase the contact points between the layer on the side of the cathode substrate 1 and the organic conductive layer 6 in order to reduce the contact resistance between the layer on the side of the cathode substrate 1 and the organic conductive layer 6. Since there is a problem of adhesion of the solid electrolyte layer to the cathode substrate 1, it is necessary to avoid having any contact point between the solid electrolyte layer and the cathode substrate 1. Therefore, a dense organic conductive layer (dense layer 4) is formed on the surface of the layer on the side of the cathode substrate 1 to reduce the space for the solid electrolyte to penetrate between the layer on the side of the cathode substrate 1 and the organic conductive layer 6.

With regard to the organic conductive layer 11 in the electrolytic capacitor, which will be described later, an element is prepared by impregnating it with the electrolytic solution for the hybrid type electrolytic capacitor. This impregnation with the electrolytic solution is performed after the formation of the solid electrolyte layer. In other words, in the step of forming the solid electrolyte layer, the dispersion solution of the conductive polymer first enters the porous layer 5 and then adheres to the surface of the dense layer 4 formed underneath the porous layer 5 by vacuum impregnation, reduces the voids to make it denser, so that it is integrated with the solid electrolyte layer. The organic conductive layer 6 that has consisted of the dense layer 4 and the porous layer 5 before the formation of the solid electrolyte layer becomes the organic conductive layer 11 consisting of the dense layer 4 and the porous layer 5 having a reduced porosity to make it denser.

For the solid electrolyte layer side, it is desirable to increase the contact area between the organic conductive layer 6 and the solid electrolyte layer in order to increase the adhesion of the solid electrolyte layer to the organic conductive layer 6 by the anchoring effect and to reduce the resistance between the organic conductive layer 6 and the solid electrolyte layer. Therefore, in the cathode current collectors 7 and 8 which are the embodiment of the first aspect according to the invention, a porous organic conductive layer (porous layer 5) is formed on the surface of the dense layer 4 as a layer which will be in contact with the solid electrolyte layer.

For example, Patent Literature 2 discloses that the dense organic conductive layer improves the adhesion, but the problem remains that the electrolytic solution permeates into the interface between the cathode current collector and the solid electrolyte layer, resulting in poor contact. However, since the solid electrolyte layer will retain the electrolytic solution by impregnation with the electrolytic solution, the electrolytic solution may penetrate into the interface between the organic conductive layer and the solid electrolyte layer, resulting in deteriorated contact. However, in the cathode current collectors 7 and 8 according to the present invention, the outermost layer is not smooth but porous, and the anchoring effect prevents deterioration of the contact.

The organic conductive layer 6 is preferably an electrolytically polymerized film because it can be formed on the surface of the layer on the side of the cathode substrate 1 with good adhesion.

Here, in the case of the cathode current collector 7 which does not include the inorganic conductive layer 3, the electrolytically polymerized film will be formed on the surface of the oxide layer 2. Therefore, electrolytic polymerization is carried out with a feed layer previously provided on the surface of the oxide layer 2 using it as a working electrode. Here, the feed layer can be formed by known methods. For example, a very thin conductive polymer dispersion is precoated on the surface of the oxide layer 2. The precoated feed layer can also be an inorganic conductive material (e.g., manganese dioxide). The precoated feed layer can also be an organic conductor, but in the case of the organic conductor, it will form a part of the organic conductive layer 6 by subsequent electrolytic polymerization.

On the other hand, in the case of the cathode current collector 8, the inorganic conductive layer 3 is already formed on the surface of the oxide layer 2. Therefore, the electrolytic polymerization can be carried out using the cathode substrate having the oxide layer 2 and the inorganic conductive layer 3 formed sequentially on the surface of the cathode substrate 1 as the working electrode.

The formation of the electrolytically polymerized film is carried out by constant-current or constant-potential polymerization in which the cathode substrate 1 having the precoated layer or inorganic conductive layer 3 formed on the surface of the oxide layer 2 and a counter electrode made of platinum or the like are immersed in a polymerization solution containing at least a monomer, a supporting electrolyte and a solvent, and a voltage is applied between the precoated layer or inorganic conductive layer 3 and the counter electrode. As the solvent for the electrolytic polymerization, a solution that can dissolve desired amounts of the monomer and the supporting electrolyte and does not affect the electrolytic polymerization can be used without limitation, but it should contain water. Depending on the electrolytic conditions of the electrolytic polymerization, the dense layer 4 and the porous layer 5 can be separately produced.

For the conductive polymer contained in the organic conductive layer 6, its type is not particularly limited, and conductive polymers derived from monomers having known π-conjugated double bonds can be used. However, thiophene or its derivative is preferably used because it can provide high conductivity and high temperature durability, and examples of the derivative include 3,4-ethylenedioxythiophene, 3-alkylthiophene, 3-alkoxythiophene, 3-alkyl-4-alkoxythiophene, 3,4-alkylthiophene, 3,4-alkoxythiophene, and alkylated ethylenedioxythiophene in which the above 3,4-ethylenedioxythiophene is modified with alkyl groups, and sulfonated polyesters can be used as the supporting electrolyte that will serve as a dopant. The sulfonated polyesters are polymeric anions which will be incorporated into the polymer of thiophene or its derivative obtained by electrolytic polymerization and act as dopants.

(4-1-a) Regarding Dense Layer 4

The dense layer 4 of the organic conductive layer 6 is present at the interface between the organic conductive layer 6 and the oxide layer 2 in the cathode current collector 7, or at the interface between the organic conductive layer 6 and the inorganic conductive layer 3 in the cathode current collector 8. As used herein, the phrase "present at the interface" means that it is formed by a layer structure continuously present between the organic conductive layer 6 and the oxide layer 2 in the cathode current collector 7 or the inorganic conductive layer 3 in the cathode current collector 8.

The dense layer 4 refers to a layer in which the substances forming the organic conductive layer are bonded so continuously that there is no room for other substances to penetrate into the interior of the layer and there is substantially no void. The term "substantially no void" means that the number of voids having a maximum diameter of 20 nm or more observable to the naked eye is less than 5 per 1 μm of the thickness in all of 10 fields of view observed in cross-sectional observation with a scanning electron microscope at magnifications of 50,000.

Even if there is a part that is not continuous because of the presence of the voids, the phrase "layer structure continuously present" also include a structure in which the voids do not continuously connect the oxide layer 2 in the cathode current collector 7 or the inorganic conductive layer 3 in the cathode current collector 8 to the porous layer 5, and there is no void having a diameter larger than the thickness of the dense layer 4 between the oxide layer 2 in the cathode current collector 7 or the inorganic conductive layer 3 in the cathode current collector 8 and the porous layer 5.

When a roughening treatment such as an etching treatment is previously carried out on the surface of the cathode substrate 1, the organic conductive layer 6 grows to cover surface portions of the concave portions formed by the roughening treatment, and when it reaches the position on the surface where no concave portion is formed, it grows uniformly on that surface in the same way as in the case where the surface of the cathode substrate 1 is smooth. At this time, by adjusting the electrolytic conditions of electrolytic polymerization, the organic conductive layer that has grown uniformly on the surface can have substantially no void. Therefore, even if the cathode substrate 1 has been previously subjected to the roughening treatment, the dispersion solution or electrolytic solution containing the dispersion of the conductive polymer, which will be the solid electrolyte, is blocked by the dense layer 4 and does not penetrate into the concave portions formed from the surface to the interior of the cathode substrate 1 by the roughening treatment.

In the cathode current collectors 7 and 8, which are embodiments according to the first aspect of the invention, the thickness of the dense layer 4 is not particularly limited, but in order to ensure a more secure contact point with the layer on the side of the cathode substrate 1 so that the penetration of the dispersion of the conductive polymer that will be the solid electrolyte can be sufficiently suppressed, the thickness of the dense layer 4 is preferably more than or equal to a certain thickness, preferably at least 0.02 μm.

However, if it is too thick, a difference between thermal expansion coefficients of the cathode substrate 1 and the organic conductive layer 6 cause a problem of peeling of the organic conductive layer 6 due to stress caused by long-term thermal load associated with use, resulting in an increased ESR. Therefore, the thickness of the dense layer 4 is preferably less than or equal to a certain thickness, preferably less than 15 μm.

The oxide layer 2 of the cathode current collector used as an electrolytic capacitor has a thickness of generally less than or equal to 0.1 μm, and the thickness of the inorganic conductive layer 3 is generally less than or equal to 3 μm on average, which has sufficiently thin, so that it will not the factor of the peeling due to the difference between the thermal expansion coefficients.

Therefore, the thickness of the dense layer 4 is preferably more than or equal to 0.02 μm and less than 15 μm, because it can sufficiently suppress the penetration of the dispersion solution of the conductive polymer between the layer on the side of the cathode substrate 1 and the organic conductive layer 6 and also more reliably suppress the peeling of the organic conductive layer 6 due to long-term thermal load associated with use.

The dense layer 4 is preferably an electrolytically polymerized film. The formation of the dense layer 4 and the porous layer 5 is determined by polymerization conditions.

Specifically, it is determined by a growth rate (polymerization rate), which represents electrochemical charge transfer, and if a monomer concentration (which must be adjusted together with a water/organic solvent ratio) is low, monomer diffusion is in rate-limiting, or the polymerization rate is slow, the dense layer 4 will be formed.

On the other hand, if the monomer concentration (which must be adjusted together with the water/organic solvent ratio) is sufficient and the monomer diffusion is not problematic, a faster polymerization rate will result in a structure in which a fibrous polymer is folded, thereby forming the porous layer 5.

The dense layer 4 grows to cover the surface of the conductive substrate. However, the slower the polymerization rate, the longer the production time and the higher the cost, so the thickness of the dense layer 4 is more preferably more than or equal to 20 nm and less than 2.5 μm. In the process of the electrolytic polymerization, the ions released from the supporting electrolyte are incorporated as dopants into the organic conductive layer that is the conductive polymer.

(4-1-b) Porous Layer 5

The porous layer 5 refers to a layer in which the substance making up the organic conductive layer is formed with spaces (voids) through which other substances can penetrate into the interior of the layer, and in which a large number of voids can be observed with the naked eye in the thickness direction when observed in the cross section using a scanning electron microscope at magnifications of 50,000. For example, when viewed in the cross section as shown in FIG. 5, the structure has internal voids that are connected to the outer surface of the cathode current collector.

The thickness of the porous layer 5 is not limited, but if it is too thin, the anchoring effect may not be sufficient and sufficient adhesion may not be achieved. If the thickness of the porous layer 5 is less than 2 µm, the anchoring effect and adhesion tend to be insufficient. Therefore, the thickness of the porous layer 5 is preferably 2 µm or more.

However, if the porous layer 5 is too thick, the size of the capacitor element increases and the distance between the cathode substrate 1 and an anode substrate increases, which may increase the ESR. Further, when the residue of the electrolytic solution used for electrolytic polymerization increases the rate of change of the ESR, and so if the porous layer 5 is thicker than 25 µm, it will be difficult to completely remove the residue in the voids of the porous layer 5 even by washing, and the rate of change of the ESR may increase. Therefore, the thickness of the porous layer 5 is preferably less than 25 µm.

Therefore, the thickness of the porous layer 5 is preferably more than or equal to 2 µm and less than or equal to 25 µm, because it can achieve a sufficient anchoring effect to the solid electrolyte layer to ensure a sufficient adhesion to the solid electrolyte layer, and it also can more reliably suppress the increase in the rate of change of the ESR due to the residue of the electrolytic solution in the voids of the porous layer 5.

Furthermore, during the impregnation of the conductive polymer that will be the solid electrolyte, the conductive polymer is incorporated into the porous layer, but the anchoring effect is not changed even if the layer is thicker than 12 µm. A thicker porous layer 5 requires a longer washing step in order to remove the residue of the electrolytic solution. In view of the foregoing, the thickness of the porous layer 5 is preferably more than or equal to 2 µm and less than or equal to 12 µm, because it can shorten the washing step for removing the residue of the electrolytic solution, i.e., the production step of the cathode current collectors 7 and 8, in addition to more reliably ensuring of the adhesion to the solid electrolyte layer and more reliably suppressing of the increase in the rate of change of the ESR due to the residue of the electrolytic solution.

The porosity of the porous layer 5 is not particularly limited, but if the porosity is too small, the contact area with the solid electrolyte layer becomes too small, so that any sufficient anchoring effect cannot be obtained and any sufficient adhesion cannot be achieved. And if the cathode current collector 7 or 8 having a lower porosity of the porous layer 5 is used for the electrolytic capacitor according to the present invention, it will be difficult to achieve further high durability. Also, if the porosity is too high, it causes a problem of the adhesion that the dense layer 4 tends to be peeled off from the porous layer 4 and also peeled off during winding.

Therefore, the porosity of the porous layer 5 is preferably more than or equal to 0.1 and less than or equal to 0.7, because it can achieve a sufficient anchoring effect to the solid electrolyte layer and provide a sufficient adhesion to the solid electrolyte layer to enable further high durability, and it also can suppress the peeling from the dense layer 4. The porosity of the porous layer 5 is further preferably more than or equal to 0.3 and less than or equal to 0.7, because it can further improve the anchoring effect to the solid electrolyte layer while suppressing the peeling from the dense layer 4.

The anchoring effect of the porous layer 5 on the solid electrolyte layer is now described herein. In a solid electrolyte layer forming step of the electrolytic capacitor, the dispersion solution containing the conductive polymer that will be the solid electrolyte layer is impregnated in vacuum and dried by a heat treatment to solidify it. During solidification, the outermost layer of the cathode current collectors 7 and 8 is the porous layer 5, which shrinks while containing the solid electrolyte in the voids of the porous layer 5, and more firmly adheres to the solid electrolyte layer.

The porous layer 5 is preferably an electrolytically polymerized film. In the case of electrolytic polymerization, if the monomer concentration (which must be adjusted together with the ratio of water and organic solvent) is sufficient and the monomer diffusion is not problematic, a higher polymerization rate produces a structure having large voids, such as an aggregate of fiber structures. The porosity of the porous layer 5 can then be controlled by drying conditions after the organic conductive layer having such a large pore structure has been formed. The higher the drying temperature, the lower the percentage of voids, i.e., the lower the porosity, and the lower the drying temperature, the higher the percentage of voids, i.e., the higher the porosity. The higher the drying temperature, the lower the porosity and the higher the density of the porous layer 5, resulting in a thinner porous layer 5.

The porous layer 5 may be a multi-layer structure in which the porosities of adjacent layers are different from each other. The porosity of each layer making up the porous layer 5 may be higher or lower in order from the side formed on the surface of the dense layer 4. The high porosity and low porosity may be alternated. The porosities of adjacent layers of a portion making up the porous layer 5 may be the same as each other, and the porosity may be the same for all the layers making up the porous layer 5. In other words, it is arbitrary how the porosity of each layer making up the porous layer 5 is set.

If the porous layer 5 has the multi-layer structure, there is no particular upper limit for the number of layers making up the porous layer 5.

In order to make the porous layer 5 the multilayer structure in which the porosities of adjacent layers are different from each other, it can be formed by controlling the drying conditions in a plurality of stages or by a multi-stage production step with intermediate drying therebetween. For example, in order to increase the porosity of the porous structure sequentially from the side of the cathode substrate 1 to the outer layer so as to improve the adhesion to the solid electrolyte layer without deteriorating the adhesion to the side of the cathode substrate 1, the electrolytic polymerization and subsequent drying may be repeated, and the drying temperature may be successively lowered for each repetition.

(4-2) Organic Conductive Layer 9

The organic conductive layer 9 of the cathode current collector 10, which is an embodiment according to the second aspect of the invention, is composed of the dense layer provided on the surface of the layer on the side of the cathode substrate 1.

For the side of the cathode substrate 1, the dense layer is formed on the surface of the layer on the side of the cathode substrate 1 to suppress the penetration of the dispersion solution of the conductive polymer during the impregnation of the conductive polymer that will be the solid electrolyte between the layer on the side of the cathode substrate 1 and the organic conductive layer 9. The thickness of the organic conductive layer 9 is then set to be more than 2 μm in order to sufficiently suppress the permeation of the electrolytic solution during the impregnation with the electrolytic solution. Furthermore, the thickness of the organic conductive layer 9 is preferably 2.5 μm or more in order to sufficiently reduce the effect of deterioration of adhesion over time due to the permeation of the electrolytic solution.

However, if the organic conductive layer 9 is too thick, the size of the capacitor element increases and the distance between the cathode substrate 1 and the anode substrate increases, resulting in an increase in the ESR. Therefore, the thickness of the organic conductive layer 9 should be 22 μm or less. If it is too thick, the thermal expansion coefficients of the cathode substrate and the organic conductive layer are different, so that the long-term thermal load associated with use causes a problem of peeling of the organic conductive layer 9 due to stress, resulting in an increase in the ESR. Therefore, the thickness of the organic conductive layer 9 is preferably 15 μm or less.

Therefore, in order to sufficiently suppress the penetration of the dispersion solution of the conductive polymer and the electrolytic solution and to suppress the increase in the ESR due to the distance between the cathode substrate 1 and the anode substrate, the organic conductive layer 9 should be composed of the dense layer provided on the surface of the layer on the side of the cathode substrate 1, and the thickness of the organic conductive layer 9 should be more than 2 μm and less than or equal to 22 μm or less. The thickness is preferably more than or equal to 2.5 μm and less than or equal to 15 μm, because it can sufficiently reduce the impact of deterioration of adhesion over time due to the penetration of the electrolytic solution and suppress the peeling of the organic conductive layer 6 due to the long-term thermal load associated with use.

The definition of the dense layer in the organic conductive layer 9 is the same as that of the dense layer 4 in the organic conductive layer 6. The method of producing the dense layer in the organic conductive layer 9 is also the same as that of the dense layer 4 in the organic conductive layer 6. The evaluation method for the dense layer in the organic conductive layer 9 is also the same as that for the dense layer 4 in the organic conductive layer 6.

2. Regarding Electrolytic Capacitor

The electrolytic capacitors according to the third and fourth aspects of the present invention are solid electrolytic capacitors or hybrid electrolytic capacitors using at least a solid electrolyte containing a conductive polymer as an electrolyte component. For the cathode current collector, only the organic conductive layer is described herein.

(1) Regarding Anode

Anodes used for conventional electrolytic capacitors can be used without particular limitations. For example, a surface of an anode substrate made of a valve metal is subjected to a surface expanding treatment, and a dielectric oxidization film is formed on the surface of the surface expanding-treated anode substrate by an anodization treatment.

For example, aluminum, tantalum, niobium and titanium can be used as materials for the anode substrate. The anode substrate can be in the form of a foil or wire, for example. The anode substrate is preferably an aluminum foil.

For example, etching, evaporation and sintering can be used as methods for the surface expanding treatment. If the surface expanding treatment is the etching, it can be chemical or electrochemical. The pits formed by etching may be sponge-like pits, tunnel-like pits or a combination of both. If the surface expanding treatment is the evaporation or sintering, the material of the valve metal particles deposited on the surface of the anode substrate may be the same as or different from the material of the anode substrate.

Examples of the electrolytic solutions used in the anodization step includes an ammonium adipate solution, an ammonium phosphate solution and an ammonium borate solution.

(2) Solid Electrolyte Layer

The type of the conductive polymer in the solid electrolyte layer is not limited, and conductive polymers derived from monomers having π-conjugated double bonds used in conventional electrolytic capacitors may be used. It may also be derived from the same monomer as that of the conductive polymer contained in the organic conductive layer 6 or 9, or it may be derived from different monomers. However, it is further preferred that both the conductive polymer in the solid electrolyte layer and the conductive polymer in the organic conductive layer 6 or 9 are poly(3,4-ethylenedioxythiophene), because it can provide particularly high conductivity and high temperature durability.

The solid electrolyte layers currently used in electrolytic capacitors having a cathode current collector with a cathode substrate made of a valve metal are of two types: those formed using a dispersion solution containing a dispersion comprised of particles of a conductive polymer and a dispersing agent; and those formed using chemical polymerization using a monomer and an oxidizing agent. As has been described, the present invention is particularly effective when using the solid electrolyte layer with the dispersion solution, but it is also effective when using chemical polymerization. In other words, the chemical polymerization has a problem that the surface of the cathode current collector becomes acidic and damaged during the chemical polymerization of the monomer and oxidizing agent. Therefore, by forming the organic conductive layer on the surface of the cathode current collector, which prevents the penetration of the polymerization solution such as monomers and oxidizing agents, the damage to the surface of the cathode current collector during chemical polymerization can be suppressed to decrease the ESR and make it more high durability.

(3) Regarding Electrolytic Solution

Electrolyte solutions containing at least a solvent and a solute dissolved therein, which are used in conventional electrolytic capacitors, can be used and are selected according to requirements such as operating temperatures required for the hybrid electrolytic capacitor as needed. Examples of the electrolytic solutions include electrolytic solutions having solutes such as salts of benzoic acid, phthalic acid, terephthalic acid, salicylic acid, tartaric acid, oxalic acid, glutaric acid, adipic acid, azelaic acid, maleic acid, fumaric acid and citric acid dissolved in solvents such as γ-butyrolactone, ethylene glycol, diethylene glycol, ethylene glycol monomethyl ether, sulfolane, 3-methylsulfolane, 2,4-dimethylsulfolane, acetonitrile and water. The salts include quaternary ammonium salts such as ammonium salts, tetramethylammonium salts and triethylmethylammonium salts, quaternized amidinium salts such as ethyldimethylimidazolinium salts and tetramethylimidazolinium salts, and amine salts such as trimethylamine salts and triethylamine salts. The above solvents may be used alone or in a mixture of two or more solvents. The above solutes may also be used alone or in a mixture of two or more. These electrolytic solutions may contain known additives in addition to the solvents and solutes described above.

(4) Regarding Separator

Separators used in conventional electrolytic capacitors can be used without particular limitations. For example, woven or non-woven fabrics or mixed papers made of cellulose-based fibers or their derivative resins can be used.

(5) Regarding Capacitor

Each of the anode and cathode current collector 7, 8 or 10 obtained above is connected to a terminal, and the dielectric layer of the anode and the organic conductive layer 6 of the cathode current collector 7 or 8 or the organic conductive layer 9 of the cathode current collector 10 are opposed to each other via a separator to form a capacitor element. It should be noted that the capacitor element can be wound or stacked. For both the anode terminal and the cathode terminal, the terminals used in conventional electrolytic capacitors may be used without particular limitations.

The capacitor element is then dried after performing a restorative chemical conversion on the capacitor element. The impregnation and drying of the capacitor element in a dispersion solution containing a dispersion comprised of particles of the conductive polymer is then repeated as needed to form a solid electrolyte layer. The resulting capacitor element is then sealed in an outer casing to obtain a solid electrolytic capacitor.

When obtaining a hybrid electrolytic capacitor, the solid electrolyte layer is formed in the same manner as that of the solid electrolytic capacitor, and the resulting element is then impregnated with the electrolytic solution before being sealed in the outer case.

(6) Organic Conductive Layer 11 in Electrolytic Capacitor

The organic conductive layer 11 in the electrolytic capacitor is provided in close contact with the surface of the oxide layer 2, and the thickness of the organic conductive layer 11 is more than 2 μm and less than or equal to 22 μm. When the inorganic conductive layer 3 is formed on the surface of the oxide layer 2, the organic conductive layer 11 is provided in close contact with the surface of the inorganic conductive layer 3. As a result, the contact points between the layer on the side of the cathode substrate 1 and the organic conductive layer 11 are increased, the resistance between the layer on the side of the cathode substrate 1 and the organic conductive layer 11 can be decreased, and the penetration of the dispersion solution containing the dispersion of the conductive polymer and the electrolytic solution can be sufficiently suppressed. The method for confirming whether the organic conductive layer 11 adheres to the layer on the side of the cathode substrate 1 will be described below in detail.

Figure 4:
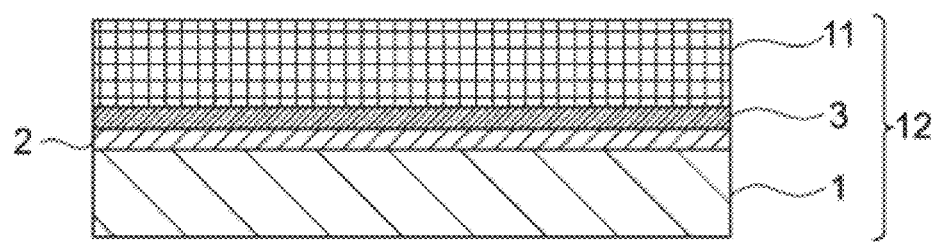
FIG. 4 is a cross-sectional view showing a layer structure of a cathode current collector in an electrolytic capacitor, which is an embodiment of a third aspect according to the present invention.

The cathode current collector 12 in the electrolytic capacitor is schematically shown in FIG. 4. As described above, in the process of incorporating the cathode current collector into the capacitor element, there is a step of impregnating the capacitor element with the dispersion solution of the conductive polymer that will be the solid electrolyte layer, and subjecting it to a heat treatment. The vacuum impregnation method is mainly used for impregnation, and in the process, if the organic conductive layer before the solid electrolyte layer is formed contains a porous layer 5, the porous layer 5 is compressed and attached to the surface of either the dense layer 4 formed under it, or the inorganic conductive layer 3, or the oxide layer 2, thereby reducing voids to render it more dense (if the porous layer 5 has a multi-layer structure in which the porosities of the adjacent layers are different from each other, all the layers making up the porous layer 5 are compressed, thereby reducing voids to render it more dense). Therefore, even if the organic conductive layer before forming the solid electrolyte layer consists only of the dense layer 4, and even if it consists of the dense layer 4 and the porous layer 5 formed on its surface, or it consists only of the porous layer 5, the organic conductive layer 11 is provided in close contact with the surface of the layer on the side of the cathode substrate 1, as shown in the schematic view in FIG. 4.

In the organic conductive layer 11, it is difficult to distinguish the dense layer 4 and the porous layer 5 before they are incorporated into the capacitor element.

After forming the solid electrolyte layer as described above, the impregnation with the electrolytic solution is carried out. In this case, to sufficiently prevent the penetration of the electrolytic solution that is even more permeable than the dispersion solution of the conductive polymer that will be the solid electrolyte between the layer on the side of the cathode substrate 1 and the organic conductive layer 11, the organic conductive layer 11 must be more than or equal to a certain thickness. However, if it is too thick, the size of the capacitor element will increase, the distance between the cathode substrate 1 and the anode substrate will increase, so that the ESR will increase. Therefore, the thickness of the organic conductive layer 11 should be more than 2 μm and less than or equal to 22 μm or less in order to sufficiently suppress the penetration of the electrolytic solution and to suppress the increase in the ESR caused by the distance between the cathode substrate 1 and the anode substrate.

Furthermore, if it is too thin, the impact of deterioration of the adhesion due to the penetration of the electrolytic solution over time cannot be sufficiently reduced, and if it is too thick, the difference between the thermal expansion coefficients of the cathode substrate 1 and the organic conductive layer 11 cause a problem of peeling of the organic conductive layer 11 due to stress cause by long-term thermal load associated with use, resulting in an increase in the ESR. Therefore, the thickness of the organic conductive layer 11 is preferably more than or equal to 2.5 μm and less than or equal to 15 μm, because it can suppress the penetration of the electrolytic solution, even the penetration of the electrolyte over time, and reduce the impact of the deterioration of the adhesion, and it can also suppress the increase in the ESR caused by the distance between the cathode substrate 1 and the anode substrate, in addition to the increase in the ESR caused by the long-term thermal load associated with use.

The adhesion of the organic conductive layer 11 can also be evaluated by the rate of change of the ESR before and after application of a reverse voltage. If the organic conductive layer 11 adheres well and sufficiently inhibits the penetration of the electrolytic solution, the rate of change of the ESR is small because there is little change in an interface (e.g., peeling or oxidation of the aluminum substrate) when the reverse voltage is applied. Conversely, if the adhesion is poor or the thickness of the organic conductive layer 11 is insufficient, the electrolytic solution will penetrate into the interface and the organic conductive layer 11 will tend to be peeled off due to the penetration of the electrolytic solution, and the aluminum substrate will be oxidized over time and the interface resistance will increase, resulting in a large rate of change of the ESR before and after the application of the reverse voltage. In Examples described below, e.g., Comparative Example 1 without the organic conductive layer 11 as well as Comparative Examples 3 (a thickness of 0.2 μm) and 4 (a thickness of 1.7 μm) with the thinner organic conductive layer 11, each using a smooth substrate, the rate of change of the ESR when a reverse voltage of 1.2 mA/cm² was applied to the cathode area for 30 minutes was 750% for Comparative Example 1, 600% for Comparative Example 3 and 190% for Comparative Example 4. However, when the organic conductive layer 11 was more than 2 µm, e.g., in Example 9 (a thickness of 2.1 µm), the rate of change of the ESR was 116%. Furthermore, when it was 2.5 µm or more, e.g., in Example 10 (a thickness of 2.5 µm) and Example 15 (a thickness of 3.4 µm), the rate of change of the ESR was 94% for Example 10, and 86% for Example 15. As compared with those having the organic conductive layer 11 of more than 2 µm, those having no organic conductive layer 11 or thinner organic conductive layer 11 cannot sufficiently suppress the penetration of the electrolytic solution, resulting in increased interface resistance due to the peeling of the organic conductive layer 11, or gradually growth of an oxide film of the cathode aluminum substrate as an amount of the applied electricity at the peeled portion is increased, so that the interface resistance will increase. Therefore, in order to sufficiently inhibit the penetration of the electrolytic solution, the thickness of the organic conductive layer 11 should be more than 2 µm, preferably more than or equal to 2.5 µm.

It should be noted that the cathode current collector removed after disassembling the capacitor is obtained with the solid electrolyte layer adhering to the surface layer. The solid electrolyte layer is then removed as much as possible by washing. As the adhesion of the solid electrolyte layer is weaker than that of the organic conductive layer, only the solid electrolyte layer can be removed, excluding the solid electrolyte layer incorporated into the organic conductive layer 11. It can be removed by washing with water or an organic solvent. The thickness can then be measured by the same method as that of the organic conductive layer of the cathode current collector before it becomes a capacitor. The solid electrolyte layer incorporated into the organic conductive layer 11 can be regarded as a part of the organic conductive layer 11.

In order to produce the electrolytic capacitor provided by the fourth aspect according to the invention, if the dense layer 4 in the cathode current collector before it is incorporated into the capacitor element is less than 2 µm, a porous layer 5 should further be formed, and the thinner the dense layer 4, the thicker the porous layer 5.

3. Regarding Evaluation Method (1) Presence/Absence of Formation of Dense Layer 4

A cross-sectional sample of the cathode current collector before it is incorporated into the capacitor element, in which the organic conductive layer is formed, is prepared using a cross-sectional polisher, and 10 fields of view are observed with a scanning electron microscope at magnifications of 50,000 while changing the observation position. The number of voids that can be observed in the image is then checked for the layer on the surface of the layer on the side of the cathode substrate 1 in each field of view. If the number of voids having a maximum diameter of 20 nm or more that can be observed in the image for all observed 10 fields of view is a frequency of less than 5 voids per 1 µm thickness, it is determined that the dense layer 4 is formed on the side of the cathode substrate 1. As used herein, the phrase "the number of voids is a frequency of less than 5 voids per 1 µm thickness" means that when the number of voids is confirmed while scrolling a range of 1 µm thickness from the interface between the layer on the side of the cathode substrate 1 and the organic conductive layer to the outer surface of the cathode current collector, the number of voids existing in this range of 1 µm thickness is less than 5. The dense layer is defined as the layer up to the front of the uppermost void where the number of voids is more than 5 voids per 1 µm thickness. If there are five or more voids in the range of 1 µm from the interface between the layer on the side of the cathode substrate 1 and the organic conductive layer, the thickness of 1 µm is reduced toward the side of the cathode substrate 1, and the thickness in which the number of voids is less than 5 is checked, and the dense layer is defined as the layer up to the front of the uppermost void where the frequency of 5 voids or more is reached.

It should be noted that if the thickness of the layer provided on the surface of the layer on the side of the cathode substrate 1 exceeds the thickness that can be contained in a field of view at magnifications of 50,000, the number of voids should be necessarily confirmed for all portions in the thickness direction by sequentially changing the observation position.

(2) Regarding Thickness of Dense Layer 4

For the layer provided on the side of the cathode substrate 1, after confirming that it is the dense layer 4, its thickness is measured using the length measuring function of the scanning electron microscope in 10 fields of view at different observation positions. More particularly, the number of voids is checked in the thickness direction from the interface between the dense layer 4 and the layer on the side of the cathode substrate 1, and the thickness is measured up to the front of the uppermost void where the number of voids having a maximum diameter of 20 nm or more is a frequency of 5 voids or more per 1 µm thickness. The observation magnification when measuring the thickness is the maximum magnification at which the dense layer 4 provided on the side of the cathode substrate 1 can be contained in one field of view in the thickness direction. The thickness of the dense layer 4 is defined as an average of the thicknesses in the respective fields of view. The 10 fields of view for measuring the thickness and the 10 fields of view for checking whether or not the dense layer is formed may be at different observation positions or may be the same observation position.

(3) Regarding Presence/Absence of Porous Layer 5

For the layer provided on the surface of the layer on the side of the cathode substrate 1 described above, when it is confirmed to be the dense layer 4 and its thickness is measured, the number of voids that can be observed in the image is also checked for the organic conductive layer provided on the surface of the dense layer 4 as in the above item (1) for 10 fields of view at different observation positions. If the number of voids having a maximum diameter of 20 nm or more that can be observed in the image is 5 voids or more per 1 µm thickness for all 10 fields of view observed, it is determined that the porous layer 5 is formed. To determine the presence or absence of the porous layer, the number of voids falling within a thickness of 1 µm is used when the number of voids is checked sequentially in the thickness direction from the interface between the porous layer 5 and the dense layer 4.

(4) Regarding Thickness of Porous Layer 5

Once the layer provided on the surface of the dense layer 4 is confirmed to be the porous layer 5, the thickness from the interface between the dense layer 4 and the porous layer 5 to the outer surface of the porous layer 5 is measured using the length measuring function of the scanning electron microscope in 10 fields of view at different observation positions. The observation magnification for the thickness measurement is the maximum magnification that can accommodate the porous layer 5 provided on the surface of the dense layer 4 in one field of view in the thickness direction. The thicknesses of the layers identified as the porous layer 5 in the respective fields of view are averaged, and the average is defined as the thickness of the porous layer 5.

(5) Regarding Porosity of Porous Layer 5

The porosity of the porous layer 5 is calculated here using a thickness a (μm) of the porous layer 5 and a thickness c (μm) of the organic conductive layer densified by compressing the voids (hereinafter, referred to as a "compressed densified layer"). First, by drying the organic conductive layer 6 while compressing it in a wet state, the voids in the porous layer 5 are collapsed and the porous layer 5 becomes a compressed densified layer. Therefore, a change in the thickness before and after the densification by compression indicates a degree of porosity. Therefore, the wetted cathode current collector 7 or 8 is sandwiched between a separator and a glass plate, and dried at a temperature of more than or equal to 100° C. and less than or equal to 150° C. under pressure to form the compressed densified layer from the organic conductive layer 6 consisting of the porous layer 5 and the dense layer 4. The thickness c of the compressed densified layer thus formed is determined by the same method as that of the item (4), and a porosity d is defined as a value obtained by subtracting the thickness c from the sum of the thickness a of the porous layer determined in the item (4) and a thickness b (μm) of the dense layer determined in the item (2), and dividing the resulting value by the thickness a of the porous layer before the densification by compression (Equation 1):

$$d = (a + b - c)/a. \quad \text{(Equation 1)}$$

When the porous layer 5 has a multi-layered structure in which the porosities of adjacent layers are different from each other, the total porosity of the respective layers is determined by Equation 1 as described above. The total porosity can also be the porosity of the porous layer 5.

A ratio of the void portions determined by binarizing the image can be used to confirm whether the porous layer 5 is the multi-layer structure in which the porosities of adjacent layers are different from each other. More particularly, in the thickness direction of the porous layer 5, images of all layers provided on the surface of the cathode substrate 1 observed at the maximum magnification that can be contained in a field of view are binarized to determine a ratio of the void portions of each layer making up the porous layer 5. If there is a layer in which the ratio is different by 15% or more from the adjacent layers, the porous layer 5 is determined to be the multi-layer structure in which the porosities of the adjacent layers are different from each other. The interfaces between the layers are determined by taking images of the entire porous layer 5 in the direction of the film thickness using a scanning electron microscope at magnifications of 10,000. The images are then binarized by 1 μm square in the thickness direction to determine the ratio of the void portions. If there is a position where the ratio of the void portions is changed by 15% or more, the 1 μm square is further subdivided in the thickness direction to determine the ratio of the void portions and determine interface positions where it is different by 15% or more. The guideline for subdivision is 0.1 μm or more (up to 10 equal parts). For portions where the thickness is thinner than 1 μm or they do not fall within 1 μm, the evaluation of subdivisions in the thickness direction is also used to make decisions as appropriate. Instead of the porosity from Equation 1, the porosity may be estimated from the ratio of the void portions of each layer thus determined. The multi-layer structure can also be expressed using both the relative value of the ratio of the void portions of each layer and the overall porosity.

(6) Regarding Confirmation of Adhesion of Organic Conductive Layer 11 in Electrolytic Capacitor to Side of Cathode Substrate 1

The cathode current collector 12 taken out after disassembling the capacitor element is washed with water or an organic solvent to remove the solid electrolyte and dried. A cross-sectional sample of the cathode current collector 12 on which the organic conductive layer is formed is then prepared using a cross-sectional polisher, and 10 fields of view of the interface between the side of the cathode substrate 1 and the organic conductive layer are observed using a scanning electron microscope at magnifications of 50,000 and at different observation positions. The number of voids that can be observed in the image, which are present at each interface, is then confirmed. If the number of voids having a maximum diameter of 20 nm or more observable to the naked eye in all 10 fields of view is a frequency of less than 5 voids per a field of view, and in a state where 90% or more of the interface has no void, it is determined that the organic conductive layer 11 in the electrolytic capacitor is provided in close contact with the side of the cathode substrate 1.

(7) Thickness of Organic Conductive Layer 11 in Electrolytic Capacitor

After confirming that the organic conductive layer 11 provided on the cathode current collector 12 taken out after disassembling the capacitor element is the organic conductive layer 11 provided in close contact with the side of the cathode substrate 1, the thickness of the organic conductive layer 11 is measured using the length measuring function of the scanning electron microscope in 10 fields of view at different observation positions. At this time, the thickness of the organic conductive layer 11 is measured in the portion where there is no residue of the solid electrolyte layer. The solid electrolyte layer incorporated into the organic conductive layer 11 is regarded as a part of the organic conductive layer 11. The observation magnification is the maximum magnification at which the organic conductive layer 11 can be contained in a field of view in the thickness direction. The thickness of the organic conductive layer 11 is defined as an average of the thicknesses in the respective fields of view. The 10 fields of view for measuring the thickness and the 10 fields of view for checking the adhesion may be at different observation positions or at the same observation position.

(8) ESR (Load Test)

Before conducting a load test, an ESR (initial value) of the electrolytic capacitor is measured at 100 KHz. The capacitor is then placed in a thermostatic bath at 125° C. for 2000 hours and a rated voltage of the electrolytic capacitor is applied to the electrolytic capacitor. The electrolytic capacitor is then returned to room temperature and the ESR of the capacitor is measured at 100 KHz.

EXAMPLES

While the present invention will be specifically described below based on Examples and Comparative Examples, the present invention is not limited to the following Examples. Each wound hybrid electrolytic capacitor having a rated voltage of 35 V and having each cathode current collector as shown in Table 1 was produced and evaluated according to the following procedure. Each wound solid electrolytic capacitor having a rated voltage of 25 V and having each cathode current collector as shown in Table 2 was also produced and evaluated.

Example 1

(1) Preparation of Cathode Current Collector

A smooth aluminum foil was used as the cathode substrate to obtain the cathode current collector. A natural oxide film is present on the surface of the cathode substrate. An inorganic conductive layer containing carbon was formed on the natural oxide film by ion plating. An electrolytic polymerization solution was prepared by stirring 5 g of sulphonated polyester, 785 g of water, 197 g of acetonitrile and 10 g of 3,4-ethylenedioxythiophene (EDOT) together, and visually confirming that the mixture was not separated into two phases. An aluminum foil (working electrode) with an inorganic conductive layer formed and a counter electrode made of SUS plate were then immersed in that polymerization solution, and electrolytic polymerization at a constant current was carried out at 0.1 mA/cm$^2$ for 2.5 minutes as a first stage, and electrolytic polymerization at a constant current was then carried out at 0.5 mA/cm$^2$ for 14.3 minutes as a second stage. After polymerization, the working electrode was washed with water and dried at 60° C. for 30 minutes to obtain a cathode current collector having an organic conductive layer formed on the inorganic conductive layer. The organic conductive layer in the cathode current collector according to Example 1 was a PEDOT (poly(3,4-ethylenedioxythiophene)) layer which had a dense layer with a thickness of 0.2 μm and a porous layer with a thickness 10.0 μm and which had a porosity of 0.46.

(2) Preparation of Anode

An etched aluminum foil was used as the anode substrate to obtain the anode. The aluminum foil was subjected to a anodizing treatment using an ammonium adipate solution as a chemical conversion solution to form an anodized film (dielectric layer) at a chemical conversion voltage of 56.0 V on the surface of the aluminum foil to obtain an anode.

(3) Preparation of Capacitor Element

A terminal was connected to each of the obtained anode and cathode current collector, and the dielectric layer of the anode and the organic conductive layer of the cathode current collector were stacked facing each other via a separator and were wound. The anode was then subjected to a restorative chemical conversion for 10 minutes under conditions of an applied voltage of 53.0 V and 1 mA/cm$^2$ using an ammonium dihydrogen phosphate solution, and then dried at 30° C. for 6 hours to obtain a capacitor element.

(4) Formation of Solid Electrolyte Layer

Fine particles (dispersion) of poly(3,4-ethylenedioxythiophene) doped with polystyrene sulfonic acid were dispersed in a dispersant of water plus 5% by mass of ethylene glycol to obtain a dispersion solution for forming the solid electrolyte layer. The capacitor element described above was impregnated with the obtained dispersion solution for 120 seconds in a reduced pressure atmosphere (90 kPa) and then dried at 150° C. for 20 minutes. The dispersion impregnation and drying were repeated to obtain a capacitor element with the solid electrolyte layer added. After the capacitor element was produced, the organic conductive layer was in close contact with the inorganic conductive layer and its thickness was 5.6 μm.

(5) Preparation of Hybrid Electrolytic Capacitor

An electrolytic solution was prepared by dissolving 5% by mass of ammonium borodisalicylate in ethylene glycol. A constant amount of the electrolytic solution was discharged into the capacitor element with the solid electrolyte layer added, thereby impregnating the solid electrolyte layer with the electrolytic solution to obtain a capacitor element having a composite electrolyte layer. The resulting element was sealed in an outer case. An aging treatment was carried out under conditions of 125° C. for 45 minutes while applying a voltage of 35 V to obtain a hybrid electrolytic capacitor having a rated voltage of 35 V.

(6) Evaluation of Capacitor Characteristics

As the initial characteristics, an ESR of the obtained capacitor was measured at 100 KHz under a condition of 20° C. The capacitor was then left under a high temperature condition of 125° C. for 2000 hours as an endurance test, and the ESR at 100 KHz was then measured again as the characteristics after the endurance test.

Example 2

An aluminum foil with sponge-like etched pits was used as a cathode substrate to obtain a cathode current collector. The aluminum foil was subjected to an anodizing treatment using an ammonium dihydrogen phosphate solution as a chemical conversion solution to form an anodized film (oxide layer) at a chemical conversion voltage of 2.0 V on the surface of the aluminum foil. The aluminum foil with the anodized film formed was dipped into an aqueous dispersion solution of a conductive polymer (PEDOT) to form a very thin conductive polymer layer over the anodized film. The conductive polymer layer formed by dipping is very thin so that it cannot be identified by scanning electron microscopy or measured for the thickness. Therefore, it should not be included in the thickness of the organic conductive layer according to the present invention. The conductive polymer layer formed by the dipping was used as a feed layer to carry out electrolytical polymerization by the same method as that of Example 1 to obtain a cathode current collector as the organic conductive layer, in which the same PEDOT layer as that of Example 1 was formed on the above feed layer. After that, the same procedure as that of Example 1 was repeated. The organic conductive layer after the formation of the capacitor element (after the formation of the solid electrolyte layer, hereinafter the same) was provided in close contact with the oxide layer consisting of the anodized film.

Example 3

The same procedure as that of Example 1 was carried out for the electrolytic polymerization at a constant current, with the exception that the time for the first stage was 7.5 seconds. The organic conductive layer in the cathode current collector in Example 3 was a PEDOT layer which had a dense layer with a thickness of 0.01 μm and a porous layer with a thickness of 10.0 μm and which had a porosity of 0.47. After the capacitor element was produced, the organic conductive layer was provided in close contact with the inorganic conductive layer and had a thickness of 5.4 μm.

Example 4

The same procedure as that of Example 1 was carried out for the electrolytic polymerization at a constant current, with the exception that the time for the first stage was 22.5 seconds. The organic conductive layer in the cathode current collector in Example 4 was a PEDOT layer which had a dense layer with a thickness of 0.03 μm and a porous layer with a thickness of 10.0 μm and which had a porosity of 0.47. After the capacitor element was produced, the organic conductive layer was provided in close contact with the inorganic conductive layer and had a thickness of 5.4 μm.

Example 5

The same procedure as that of Example 1 was carried out for the electrolytic polymerization at a constant current, with the exception that the time for the first stage was 25 minutes. The organic conductive layer in the cathode current collector in Example 5 was a PEDOT layer which had a dense layer with a thickness of 2.0 µm and a porous layer with a thickness of 10.0 µm and which had a porosity of 0.46. After the capacitor element was produced, the organic conductive layer was provided in close contact with the inorganic conductive layer and had a thickness of 7.4 µm.

Example 6

The same procedure as that of Example 1 was carried out for the electrolytic polymerization at a constant current, with the exception that the time for the first stage was 37.5 minutes. The organic conductive layer in the cathode current collector in Example 6 was a PEDOT layer which had a dense layer with a thickness of 3.0 µm and a porous layer with a thickness of 10.0 µm and which had a porosity of 0.46. After the capacitor element was produced, the organic conductive layer was provided in close contact with the inorganic conductive layer and had a thickness of 8.4 µm.

Example 7

The same procedure as that of Example 1 was carried out for the electrolytic polymerization at a constant current, with the exception that the time for the first stage was 175 minutes, the time for the second stage was 2.9 minutes, and the drying was carried out at 50° C. for 120 minutes after washing with water. The organic conductive layer in the cathode current collector in Example 7 was a PEDOT layer which had a dense layer with a thickness of 14 µm and a porous layer with a thickness of 2.0 µm and which had a porosity of 0.60. After the capacitor element was produced, the organic conductive layer was provided in close contact with the inorganic conductive layer and had a thickness of 14.8 µm.

Example 8

The same procedure as that of Example 7 was carried out for the electrolytic polymerization at a constant current, with the exception that the time for the first stage was 200 minutes. The organic conductive layer in the cathode current collector in Example 8 was a PEDOT layer which had a dense layer with a thickness of 16 µm and a porous layer with a thickness of 2.0 µm and which had a porosity of 0.60. After the capacitor element was produced, the organic conductive layer was provided in close contact with the inorganic conductive layer and had a thickness of 16.8 µm.

Example 9

The same procedure as that of Example 1 was carried out for the electrolytic polymerization at a constant current, with the exception that the electrolytic polymerization was carried out in one step instead of the two steps, and under the condition of 0.1 mA/cm$^2$ for 26.3 minutes. The organic conductive layer in the cathode current collector in Example 9 was a PEDOT layer which had a dense layer with a thickness of 2.1 µm. After the capacitor element was produced, the organic conductive layer was provided in close contact with the inorganic conductive layer and had a thickness of 2.1 µm.

Example 10

The same procedure as that of Example 9 was carried out for the electrolytic polymerization at a constant current, with the exception that the time was 31.3 minutes. The organic conductive layer in the cathode current collector in Example 10 was a PEDOT layer which had a dense layer with a thickness of 2.5 µm. After the capacitor element was produced, the organic conductive layer was provided in close contact with the inorganic conductive layer and had a thickness of 2.5 µm.

Example 11

The same procedure as that of Example 9 was carried out for the electrolytic polymerization at a constant current, with the exception that the time was 175 minutes. The organic conductive layer in the cathode current collector in Example 11 was a PEDOT layer which had a dense layer with a thickness of 14 µm. After the capacitor element was produced, the organic conductive layer was provided in close contact with the inorganic conductive layer and had a thickness of 14 µm.

Example 12

The same procedure as that of Example 9 was carried out for the electrolytic polymerization at a constant current, with the exception that the time was 200 minutes. The organic conductive layer in the cathode current collector in Example 12 was a PEDOT layer which had a dense layer with a thickness of 16 µm. After the capacitor element was produced, the organic conductive layer was provided in close contact with the inorganic conductive layer and had a thickness of 16 µm.

Example 13

The same procedure as that of Example 9 was carried out for the electrolytic polymerization at a constant current, with the exception that the time was 271 minutes. The organic conductive layer in the cathode current collector in Example 13 was a PEDOT layer which had a dense layer with a thickness of 21.7 µm. After the capacitor element was produced, the organic conductive layer was provided in close contact with the inorganic conductive layer and had a thickness of 21.7 µm.

Example 14

The same procedure as that of Example 1 was carried out for the electrolytic polymerization at a constant current, with the exception that the time for the first stage was 25 minutes, and the time for the second stage was 2.7 minutes. The organic conductive layer in the cathode current collector in Example 14 was a PEDOT layer which had a dense layer with a thickness of 2.0 µm and a porous layer with a thickness of 1.9 µm and which had a porosity of 0.46. After the capacitor element was produced, the organic conductive layer was provided in close contact with the inorganic conductive layer and had a thickness of 3.0 µm.

Example 15

The same procedure as that of Example 14 was carried out for the electrolytic polymerization at a constant current, with the exception that the time for the second stage was 3.6 minutes. The organic conductive layer in the cathode current collector in Example 15 was a PEDOT layer which had a dense layer with a thickness of 2.0 µm and a porous layer with a thickness of 2.5 µm and which had a porosity of 0.46.

After the capacitor element was produced, the organic conductive layer was provided in close contact with the inorganic conductive layer and had a thickness of 3.4 µm.

Example 16

The same procedure as that of Example 1 was carried out for the electrolytic polymerization at a constant current, with the exception that the time for the first stage was 6.3 minutes, and the time for the second stage was 15.7 minutes. The organic conductive layer in the cathode current collector in Example 16 was a PEDOT layer which had a dense layer with a thickness of 0.5 µm and a porous layer with a thickness of 11.0 µm and which had a porosity of 0.46. After the capacitor element was produced, the organic conductive layer was provided in close contact with the inorganic conductive layer and had a thickness of 6.5 µm.

Example 17

The same procedure as that of Example 16 was carried out for the electrolytic polymerization at a constant current, with the exception that the time for the second stage was 18.6 minutes. The organic conductive layer in the cathode current collector in Example 17 was a PEDOT layer which had a dense layer with a thickness of 0.5 µm and a porous layer with a thickness of 13.0 µm and which had a porosity of 0.46. After the capacitor element was produced, the organic conductive layer was provided in close contact with the inorganic conductive layer and had a thickness of 7.6 µm.

Example 18

The same procedure as that of Example 16 was carried out for the electrolytic polymerization at a constant current, with the exception that the time for the second stage was 34.3 minutes. The organic conductive layer in the cathode current collector in Example 18 was a PEDOT layer which had a dense layer with a thickness of 0.5 µm and a porous layer with a thickness of 24.0 µm and which had a porosity of 0.46. After the capacitor element was produced, the organic conductive layer was provided in close contact with the inorganic conductive layer and had a thickness of 13.5 µm.

Example 19

The same procedure as that of Example 16 was carried out for the electrolytic polymerization at a constant current, with the exception that the time for the second stage was 37.1 minutes. The organic conductive layer in the cathode current collector in Example 19 was a PEDOT layer which had a dense layer with a thickness of 0.5 µm and a porous layer with a thickness of 26.0 µm and which had a porosity of 0.46. After the capacitor element was produced, the organic conductive layer was provided in close contact with the inorganic conductive layer and had a thickness of 14.6 µm.

Example 20

The same procedure as that of Example 1 was carried out for the electrolytic polymerization at a constant current, with the exception that the time for the first stage was 6.3 minutes, and the drying was carried out at 30° C. for 120 minutes after washing with water. The organic conductive layer in the cathode current collector in Example 20 was a PEDOT layer which had a dense layer with a thickness of 0.5 µm and a porous layer with a thickness of 10.0 µm and which had a porosity of 0.80. After the capacitor element was produced, the organic conductive layer was provided in close contact with the inorganic conductive layer and had a thickness of 2.5 µm.

Example 21

The same procedure as that of Example 1 was carried out, with the exception that the drying was carried out at 40° C. for 120 minutes after washing with water. The organic conductive layer in the cathode current collector in Example 21 was a PEDOT layer which had a dense layer with a thickness of 0.2 µm and a porous layer with a thickness of 10.0 µm and which had a porosity of 0.70. After the capacitor element was produced, the organic conductive layer was provided in close contact with the inorganic conductive layer and had a thickness of 3.2 µm.

Example 22

The same procedure as that of Example 21 was carried out, with the exception that the temperature of the drying after washing with water was 50° C. The organic conductive layer in the cathode current collector in Example 22 was a PEDOT layer which had a dense layer with a thickness of 0.2 µm and a porous layer with a thickness of 10.0 µm and which had a porosity of 0.60. After the capacitor element was produced, the organic conductive layer was provided in close contact with the inorganic conductive layer and had a thickness of 4.2 µm.

Example 23

The same procedure as that of Example 1 was carried out, with the exception that the temperature of the drying after washing with water was 120° C. The organic conductive layer in the cathode current collector in Example 23 was a PEDOT layer which had a dense layer with a thickness of 0.2 µm and a porous layer with a thickness of 10.0 µm and which had a porosity of 0.31. After the capacitor element was produced, the organic conductive layer was provided in close contact with the inorganic conductive layer and had a thickness of 7.1 µm.

Example 24

The same procedure as that of Example 1 was carried out, with the exception that the temperature of the drying after washing with water was 150° C. The organic conductive layer in the cathode current collector in Example 24 was a PEDOT layer which had a dense layer with a thickness of 0.2 µm and a porous layer with a thickness of 10.0 µm and which had a porosity of 0.14. After the capacitor element was produced, the organic conductive layer was provided in close contact with the inorganic conductive layer and had a thickness of 8.8 µm.

Example 25

The same procedure as that of Example 1 was carried out, with the exception that the temperature of the drying after washing with water was 160° C. The organic conductive layer in the cathode current collector in Example 25 was a PEDOT layer which had a dense layer with a thickness of 0.2 µm and a porous layer with a thickness of 10.0 µm and which had a porosity of 0.05. After the capacitor element was produced, the organic conductive layer was provided in close contact with the inorganic conductive layer and had a thickness of 9.7 μm.

Example 26

The same procedure as that of Example 1 was carried out, with the exception that pyrrole was used in place of 3,4-ethylenedioxythiophene (EDOT) as a monomer to be contained in the electrolytic polymerization solution. The organic conductive layer in the cathode current collector in Example 26 was a PPY (polypyrrole) layer which had a dense layer with a thickness of 0.2 μm and a porous layer with a thickness of 10.0 μm and which had a porosity of 0.46. After the capacitor element was produced, the organic conductive layer was provided in close contact with the inorganic conductive layer and had a thickness of 5.6 μm.

Comparative Example 1

The same procedure as that of Example 1 was carried out, with the exception that the electrolytic polymerization was not carried out.

Comparative Example 2

The same procedure as that of Example 2 was carried out, with the exception that the electrolytic polymerization was not carried out.

Comparative Example 3

The same procedure as that of Example 9 was carried out for the electrolytic polymerization at a constant current, with the exception that the time was 2.5 minutes. The organic conductive layer in the cathode current collector in Comparative Example 3 was a PEDOT layer which had only a dense layer with a thickness of 0.2 μm. After the capacitor element was produced, the organic conductive layer was provided in close contact with the inorganic conductive layer and had a thickness of 0.2 μm.

Comparative Example 4

The same procedure as that of Example 9 was carried out for the electrolytic polymerization at a constant current, with the exception that the time was 21.3 minutes. The organic conductive layer in the cathode current collector in Comparative Example 4 was a PEDOT layer which had a dense layer with a thickness of 1.7 μm. After the capacitor element was produced, the organic conductive layer was provided in close contact with the inorganic conductive layer and had a thickness of 1.7 μm.

Comparative Example 5

The same procedure as that of Example 9 was carried out for the electrolytic polymerization at a constant current, with the exception that the time was 289 minutes. The organic conductive layer in the cathode current collector in Comparative Example 5 was a PEDOT layer which had a dense layer with a thickness of 23.1 μm. After the capacitor element was produced, the organic conductive layer was provided in close contact with the inorganic conductive layer and had a thickness of 23.1 μm.

Example 27

(1) Preparation of Solid Electrolytic Capacitor

A capacitor element with a solid electrolyte layer added, which was obtained by the same procedure as that of Example 1, was sealed in an outer case and aged at 125° C. for 45 minutes by applying a voltage of 25 V to obtain a solid electrolytic capacitor having a rated voltage of 25 V.

(2) Evaluation of the Capacitor Characteristics

As an initial characteristic, an ESR of the obtained capacitor at 100 KHz was measured at 20° C. The capacitor was then left under a high temperature condition of 125° C. for 2000 hours as an endurance test, and the ESR at 100 kHz was then measured again as the characteristic after the endurance test.

Example 28

A capacitor element with a solid electrolyte layer added, which was obtained by the same procedure as that of Example 2, was sealed in an outer case.

The same procedure as that of Example 27 was then carried out.

Comparative Example 6

The same procedure as that of Example 27 was carried out, with the exception that the electrolytic polymerization was not carried out.

Comparative Example 7

The same procedure as that of Example 28 was carried out, with the exception that the electrolytic polymerization was not carried out.

TABLE 1

ESR at 100 kHz before and after 125° C. Heat Resistant Test for 35 WV Hybrid Electrolytic Capacitors

| Hybrid Electrolytic Capacitors | Inorganic Conductive Layer Present/Absent | Organic Conductive Layer | | | | | | 100 kHz ESR | |
|---|---|---|---|---|---|---|---|---|---|
| | | Before Element Production | | | | After Element Production | | | |
| | | Thickness of Dense Layer [μm] | Thickness of Porous Layer [μm] | Total Thickness [μm] | Porosity of Porous Layer | Thickness [μm] | Component | Initial Value | Rate of Change |
| Ex. 1 | Present | 0.2 | 10 | 10.2 | 0.46 | 5.6 | PEDOT | 53 | 29 |
| Ex. 2 | Absent | 0.2 | 10 | 10.2 | 0.46 | 5.6 | PEDOT | 59 | 32 |
| Ex. 3 | Present | 0.01 | 10 | 10 | 0.47 | 5.4 | PEDOT | 68 | 49 |
| Ex. 4 | Present | 0.03 | 10 | 10 | 0.47 | 5.4 | PEDOT | 52 | 27 |

TABLE 1-continued

ESR at 100 kHz before and after 125° C. Heat Resistant Test for 35 WV Hybrid Electrolytic Capacitors

| Hybrid Electrolytic Capacitors | Inorganic Conductive Layer Present/Absent | Organic Conductive Layer | | | | | | 100 kHz ESR | |
|---|---|---|---|---|---|---|---|---|---|
| | | Before Element Production | | | | After Element Production | | Initial Value | Rate of Change |
| | | Thickness of Dense Layer [μm] | Thickness of Porous Layer [μm] | Total Thickness [μm] | Porosity of Porous Layer | Thickness [μm] | Component | | |
| Ex. 5 | Present | 2 | 10 | 12 | 0.46 | 7.4 | PEDOT | 53 | 29 |
| Ex. 6 | Present | 3 | 10 | 13 | 0.46 | 8.4 | PEDOT | 60 | 30 |
| Ex. 7 | Present | 14 | 2 | 16 | 0.6 | 14.8 | PEDOT | 61 | 33 |
| Ex. 8 | Present | 16 | 2 | 18 | 0.6 | 16.8 | PEDOT | 61 | 66 |
| Ex. 9 | Present | 2.1 | — | — | — | 2.1 | PEDOT | 70 | 62 |
| Ex. 10 | Present | 2.5 | — | — | — | 2.5 | PEDOT | 61 | 53 |
| Ex. 11 | Present | 14 | — | — | — | 14 | PEDOT | 59 | 51 |
| Ex. 12 | Present | 16 | — | — | — | 16 | PEDOT | 60 | 66 |
| Ex. 13 | Present | 21.7 | — | — | — | 21.7 | PEDOT | 62 | 66 |
| Ex. 14 | Present | 2 | 1.9 | 3.9 | 0.46 | 3 | PEDOT | 61 | 54 |
| Ex. 15 | Present | 2 | 2.5 | 4.5 | 0.46 | 3.4 | PEDOT | 54 | 26 |
| Ex. 16 | Present | 0.5 | 11 | 11.5 | 0.46 | 6.5 | PEDOT | 52 | 28 |
| Ex. 17 | Present | 0.5 | 13 | 13.5 | 0.46 | 7.6 | PEDOT | 53 | 29 |
| Ex. 18 | Present | 0.5 | 24 | 24.5 | 0.46 | 13.5 | PEDOT | 57 | 33 |
| Ex. 19 | Present | 0.5 | 26 | 26.5 | 0.46 | 14.6 | PEDOT | 59 | 54 |
| Ex. 20 | Present | 0.5 | 10 | 10.5 | 0.8 | 2.5 | PEDOT | 61 | 51 |
| Ex. 21 | Present | 0.2 | 10 | 10.2 | 0.7 | 3.2 | PEDOT | 59 | 31 |
| Ex. 22 | Present | 0.2 | 10 | 10.2 | 0.6 | 4.2 | PEDOT | 62 | 28 |
| Ex. 23 | Present | 0.2 | 10 | 10.2 | 0.31 | 7.1 | PEDOT | 58 | 26 |
| Ex. 24 | Present | 0.2 | 10 | 10.2 | 0.14 | 8.8 | PEDOT | 58 | 41 |
| Ex. 25 | Present | 0.2 | 10 | 10.2 | 0.05 | 9.7 | PEDOT | 61 | 52 |
| Ex. 25 | Present | 0.2 | 10 | 10.2 | 0.46 | 5.6 | PPY | 61 | 80 |
| Comp. 1 | Present | — | — | — | — | — | — | 100 | 100 |
| Comp. 2 | Absent | — | — | — | — | — | — | 98 | 98 |
| Comp. 3 | Present | 0.2 | — | — | — | 0.2 | PEDOT | 96 | 95 |
| Como. 4 | Present | 1.7 | — | — | — | 1.7 | PEDOT | 89 | 96 |
| Comp. 5 | Present | 23.1 | — | — | — | 23.1 | PEDOT | 84 | 74 |

*For the initial value of 100 kHz ESR and the rate of change after the endurance test, it shows the value of each of Examples and Comparative Examples assuming that the value of Comparative Example 1 is 100.

TABLE 2

ESR at 100 kHz before and after 125° C. Heat Resistant Test for 25 WV Solid Electrolytic Capacitors

| Solid Electrolytic Capacitors | Inorganic Conductive Layer Present/Absent | Organic Conductive Layer | | | | | | 100 kHz ESR | |
|---|---|---|---|---|---|---|---|---|---|
| | | Before Element Production | | | | After Element Production | | Initial Value | Rate of Change |
| | | Thickness of Dense Layer [μm] | Thickness of Porous Layer [μm] | Total Thickness [μm] | Porosity of Porous Layer | Thickness [μm] | Component | | |
| Ex. 27 | Present | 0.2 | 10 | 10.2 | 0.46 | 5.6 | PEDOT | 52 | 46 |
| Ex. 28 | Absent | 0.2 | 10 | 10.2 | 0.46 | 5.6 | PEDOT | 64 | 45 |
| Comp. 6 | Present | — | — | — | — | — | PEDOT | 100 | 100 |
| Comp. 7 | Absent | — | — | — | — | — | PEDOT | 81 | 89 |

*For the initial value of 100 kHz ESR and the rate of change after the endurance test, it shows the value of each of Examples and Comparative Examples assuming that the value of Comparative Example 6 is 100.

(A) Regarding Test Results for Hybrid Electrolytic Capacitors in Table 1

All of the hybrid electrolytic capacitors produced in Examples in Table 1 had lower initial ESR values and lower rates of change of the ESR after the heat resistant test than those in Comparison Examples.

First, the members other than the organic conductive layer of the cathode current collectors are described.

The surface condition of the cathode substrate, the composition of the oxide layer and the presence or absence of the inorganic conductive layer can be examined by comparing Example 1 with Example 2. In Example 1, the surface of the cathode substrate is smooth, the oxide layer consists of the natural oxide film and the inorganic conductive layer is formed. In Example 2, the surface of the cathode substrate is rough due to the formation of etching pits, the oxide layer consists of the anodic oxide film and no inorganic conductive layer is formed. The initial ESR value and the rate of change of the ESR were 53 and 29 for Example 1, respectively, and 59 and 32 for Example 2, respectively, and both the initial ESR value and the rate of change of the ESR were lower in Example 1 than in Example 2. Based on the results, it is preferable that with respect to the members other than the organic conductive layer of the cathode current collector, the surface of the cathode substrate is smooth, the oxide layer consists of the natural oxide film, and the inorganic conductive layer is formed.

The following describes the cathode current collector before the capacitor element is produced (before it is incorporated into the capacitor element), where the organic conductive layer consists of the dense layer and the porous layer.

Regarding the organic conductive layer consisting of the dense layer and the porous layer, it can be examined by comparing Example 1 with Comparative Examples 1 and 3. In Example 1, the dense layer having a thickness of 0.2 µm as in Comparative Example 3 was formed, and then the porous layer (thickness: 10 µm, porosity: 0.46) was further formed. Comparative Example 1 has the same structure as Example 1 and Comparative Example 3 with the exception that the organic conductive layer is not formed. The initial ESR value and the rate of change of the ESR were 53 and 29 for Example 1, 96 and 95 for Comparative Example 3, and 100 and 100 for Comparative Example 1, and both the initial ESR value and the rate of change of the ESR were lower in Example 1 than in Comparative Examples 1 and 3. It was found from the results that both the ESR initial value and the rate of change of the ESR could be lowered by forming the organic conductive layer consisting of the dense layer and the porous layer.

In the studies of varying the thickness of the dense layer, the thickness of the dense layer became thicker in the following order: Example 3 (0.01 µm), Example 4 (0.03 µm), Example 1 (0.2 µm), Example 5 (2 µm), Example 6 (3 µm), Example 7 (14 µm), and Example 8 (16 µm). In Example 1 and Examples 4 to 7 where the thickness of the dense layer was more than or equal to 0.02 µm and less than 15 µm, the initial ESR value was 61 or less and the rate of change of the ESR was 33 or less, which were lower than the initial ESR value of 68 and the rate of change of the ESR of 49 in Example 3 where the dense layer was 0.01 µm. It was found from the results that when the thickness of the dense layer was 0.02 µm or less, the penetration of the dispersion solution could not be sufficiently suppressed and the adhesion of the organic conductive layer to the cathode substrate was problematic, resulting in a larger initial ESR value and a larger rate of change of the ESR. On the other hand, in Example 8 where the thickness of the dense layer was 16 µm, the initial ESR value was lower than Comparative Examples, but the rate of change of the ESR was higher than the other Examples. It was found from the results that when the thickness of the dense layer was 15 µm or more, the difference between the thermal expansion coefficients of the cathode substrate and the organic conductive layer caused the problem of peeling of the organic conductive layer due to stress caused by long-term thermal load associated with use, resulting in a higher rate of change of the ESR. Examples 6 and 7 where the thickness of the dense layer was 3 µm and 14 µm, respectively, had no problem of characteristics. However, when the organic conductive layer is formed of the dense layer and the porous layer, it is more advantageous in terms of production that the porous layer that has a higher production efficiency and can increase the thickness in a shorter period of time is formed so as to be thicker, and the thinner dense layer is preferable in terms of the production task. Therefore, it was found that the thickness of the dense layer was preferably less than 2.5 µm. In view of the foregoing, it was found that the thickness of the dense layer is preferably more than or equal to 0.02 µm and less than 15 µm, and even more preferably more than or equal to 0.02 µm and less than 2.5 µm.

In the studies of varying the thickness of the porous layer, the thickness of the porous layer became thicker in the following order: Example 14 (1.9 µm), Example 15 (2.5 µm), Example 1 (10 µm), Example 16 (11 µm), Example 17 (13 µm), Example 18 (24 µm), and Example 19 (26 µm). In Examples 1 and 15 to 18 where the thickness of the porous layer was more than or equal to 2 µm and less than or equal to 25 µm, the rate of change of the ESR was less than 33, and the rate of change of the ESR was lower than the rate of change of the ESR of 54 in Examples 14 and 19 where the thickness of the porous layer was 1.9 µm and 26 µm, respectively. On the other hand, in Examples 14 and 19 where the thickness of the porous layer was 1.9 µm and 26 µm, respectively, the rate of change of the ESR was suppressed to be lower than Comparative Examples, while the rate of change of the ESR was higher than that of the other Examples. It was found from the results that when the thickness of the porous layer was thinner than 2 µm, any sufficient anchoring effect to the solid electrolyte layer could not be obtained. It was also found that when the thickness of the porous layer was thicker than 25 µm, it was difficult to completely remove the residue of the electrolytic solution used in the electrolytic polymerization which would otherwise adversely affect the ESR, from the pores of the porous layer. Furthermore, although there was no problem of the rate of change of the ESR, it was found that in Examples 17 and 18 where the thickness of the porous layer was more than or equal to 12 µm and less than or equal to 25 µm, only the production task of washing the residue of the electrolytic solution in the porous layer became longer, although the anchoring effect to the solid electrolyte layer was not changed. It was found from the results that the thickness of the porous layer was preferably more than or equal to 2 µm and less than or equal to 25 µm, and even more preferably more than or equal to 2 µm and less than or equal to 12 µm.

In the studies of varying the porosity, the void percentage is lower in the following order: Example 20 (0.8), Example 21 (0.7), Example 22 (0.6), Example 1 (0.46), Example 23 (0.31), Example 24 (0.14), and Example 25 (0.05), that is, the porosity is lower. In Examples 1 and 21 to 24 where the porosity was more than or equal to 0.1 and less than or equal to 0.7, the rate of change of the ESR was 41 or less, and the rate of change of the ESR was lower than the rate of change of the ESR of 51 and 52 in Examples 20 and 25 where the porosity was 0.8 and 0.05, respectively. Also, in Examples 1 and 21 to 23 where the porosity was more than or equal to 0.3 and less than or equal to 0.7, the rate of change of the ESR was particularly lower (31 or less). It was found from the results that the porosity was preferably more than or equal to 0.1 and less than or equal to 0.7, and even more preferably more than or equal to 0.3 and less than or equal to 0.7.

In view of the foregoing, it was found that the structure of the organic conductive layer consisting of the dense layer and the porous layer formed thereon can lower the initial ESR value and the rate of change of the ESR.

It was found that the dense layer having the thickness of more than or equal to 0.02 µm and less than 15 µm can provide sufficient contact point with the substrate, and the porous layer having the porosity of more than or equal to 0.1 and less than or equal to 0.7 and the thickness of more than or equal to 2 µm and less than or equal to 25 µm can provide a sufficient anchoring effect to the solid electrolyte layer, especially can lower the initial ESR value and the rate of change of the ESR, and can satisfactorily maintain the adhesion of the solid electrolyte layer to the cathode current collector when a load is applied.

The dense layer is preferably thicker than a certain thickness to ensure the contact point with the layer on the side of the cathode substrate 1. However, it is preferable to form the dense layer as thin as possible because the production task is longer and to form a thicker porous layer that can form the organic conductive layer at a high production efficiency and in a short period of time. The porous layer requires a sufficient thickness thick to achieve the anchoring effect and a sufficient thickness to suppress the penetration of the electrolytic solution in the capacitor element, but it preferably has a thickness range in which the residue of the electrolytic solution in the porous layer can be easily removed by washing. Also, the porosity of the porous layer is preferably such that the adhesion to the dense layer is higher and a sufficient anchoring effect to the solid electrolyte layer is obtained. In view of the foregoing, an example of an optimum combination of the dense layer and the porous layer may include a dense layer having a thickness of more than or equal to 0.02 µm and less than or equal to 0.5 µm, a porous layer having a thickness of more than or equal to 3 µm and less than or equal to 12 µm, and a porosity of more than or equal to 0.3 and less than or equal to 0.7.

Example 26 forms the organic conductive layer by electrolytically polymerizing pyrrole instead of EDOT as a monomer. Among Examples, Examples 1 and 26 had geometric structures of the organic conductive layers relatively close to each other, but the comparison of them indicates Example 1 provided with the PEDOT layer had a lower rate of change of the ESR after the heat resistance test. It was found from the results that the component of the organic conductive layer was preferably PEDOT.

The following describes the cathode current collector before the capacitor element is produced, where the organic conductive layer consists of the dense layer and has the predetermined thickness.

In studies of varying the thickness of the organic conductive layer (dense layer only), the thickness of the dense layer was thicker in order: Comparative Example 3 (0.2 µm), Comparative Example 4 (1.7 µm), Example 9 (2.1 µm), Example 10 (2.5 µm), Example 11 (14 µm), Example 12 (16 µm), Example 13 (21.7 µm), Comparative Example 5 (23.1 µm). In Examples 9 to 13 where the thickness of the organic conductive layer was more than 2 µm and less than or equal to 22 µm, the initial ESR value was 70 or less, and the initial ESR value was lower than the initial ESR value of 84 or more in Comparative Examples 3 to 5 where the thickness of the dense layer was less than or equal to 2 µm or more than 22 µm. It was found from the results that when the organic conductive layer consisted of the dense layer and the thickness of the organic conductive layer was less than or equal to 2 µm, the penetration of the electrolytic solution could not be sufficiently suppressed and the adhesion of the organic conductive layer to the inorganic conductive layer (the oxide layer if no inorganic conductive layer was formed, although the inorganic conductive layer was formed in all the above Examples) was not sufficient. It was also found that if the organic conductive layer was thicker than 22 µm, the distance between the cathode substrate and the anode substrate became too long and the impact of the increased ESR could not be ignored.

Furthermore, among Examples described above, Example 9 (2.1 µm) had a relatively high initial ESR value (70). This indicates that if the thickness of the organic conductive layer is thinner than 2.5 µm, the permeation of the electrolytic solution is not sufficiently suppressed over time, even when it is left with no load and at room temperature.

In Examples 12 and 13 where the thickness of the organic conductive layer was more than 15 µm, there was no problem of the initial ESR value, but the rate of change of the ESR was higher than that in the other Examples. It was found from the results that the difference between the thermal expansion coefficients of the cathode substrate and the organic conductive layer caused the problem of peeling of the organic conductive layer due to stress caused by the long-term thermal load associated with use, resulting in the increase in the ESR.

In view of the foregoing, it was found that when the organic conductive layer consists of the dense layer, the thickness of the organic conductive layer is more than 2 µm and less than or equal to 22 µm, preferably more than or equal to 2.5 µm and less than or equal to 15 µm.

Comparative Examples 3 and 4 form, as with Patent Literature 2, only the dense layer as the organic conductive layer on the surface of the inorganic conductive layer, so as to have the thickness in the range disclosed in Patent Literature 2. Examples 1, 3 to 8 and 14 to 26 where the porous layer was further formed as the organic conductive layer on the surface of the dense layer had lower ESR initial values and lower rates of change of the ESR after the heat resistance test than those of Comparative Examples 3 and 4. Further, Examples 9 to 13 where only the dense layer was formed as the organic conductive layer so as to have the thickness in the range of more than 2 µm and less than or equal to 22 µm had lower initial ESR values and lower rates of change of the ESR after the heat resistance test than those in Comparative Examples 3 and 4.

In view of the foregoing, the present invention in which the organic conductive layer in the cathode current collector before the capacitor element is produced consists of the dense layer and the porous layer provided on the surface of the dense layer can solve the problem of contact resistance by further improving the adhesion in the cathode current collector (the adhesion of the organic conductive layer to the oxide layer or inorganic conductive layer) and the adhesion of the solid electrolyte layer to the cathode current collector. It was also found that the present invention in which the organic conductive layer in the cathode current collector before producing the capacitor element consists of the dense layer having the thickness of more than 2 µm and less than or equal to 22 µm can solve the problem of contact resistance by further improving the adhesion in the cathode current collector (the adhesion of the organic conductive layer to the oxide layer or inorganic conductive layer).

The following describes the organic conductive layer in the electrolytic capacitor after producing the capacitor element.

When focusing on the thickness of the organic conductive layer, Comparative Examples 3 and 4 having the thickness of less than 2 µm, and Comparative Example 5 having the thickness of more than 22 µm, had larger initial ESR values and larger rates of change of the ESR after the heat resistance test than those in Examples 1 and 3 to 25. Further, Example 9 having the thickness of less than 2.5 µm and Examples 8, 12 and 13 having the thickness of more than 15 µm had the larger rates of change of the ESR than those in the other Examples above, and Examples having the thickness of more than or equal to 2.5 µm and less than or equal to 15 µm had particularly lower ESR initial values and lower rates of change of the ESR. It was found that the thickness of the organic conductive layer in the electrolytic capacitor was more than 2 and less than or equal to 22 µm, preferably more than or equal to 2.5 and less than or equal to 15 μm, for the same reasons as the results of Examples 9 to 13 and Comparative Examples 3 and 4 where the organic conductive layer was only the dense layer before producing the capacitor element.

(b) Regarding Test Results for Solid Electrolytic Capacitors in Table 2

Examples in Table 2 had lower initial ESR values and lower rates of change of the ESR after heat resistance test than those in Comparative Examples in Table 2.

As with the case where the organic conductive layer consists of the dense layer and the porous layer in the results of the hybrid electrolytic capacitors in the item (A), the solid electrolytic capacitor has the organic conductive layer obtained in each of Examples, which has the dense layer formed on the side in contact with the oxide layer or the inorganic conductive layer, as well as has the porous layer formed on the side in contact with the solid electrolyte layer. Therefore, it was found that the adhesion in the cathode current collector and the adhesion of the solid electrolyte layer to the cathode current collector are improved, thereby achieving the low ESR and lowering the rate of change of the ESR after the heat resistance test.

INDUSTRIAL APPLICABILITY

The present invention can be utilized for electrolytic capacitors using at least the solid electrolyte containing the conductive polymer as the electrolyte component.

[Additional Remarks]

The present disclosure discloses the following configurations:

[Configuration 1]

A cathode current collector comprising: a cathode substrate made of a valve metal; an oxide layer made of an oxide of the valve metal, the oxide layer being provided on a surface of the cathode substrate; and an organic conductive layer comprising a conductive polymer, the organic conductive layer being provided on a surface of the oxide layer, wherein the organic conductive layer consists of a dense layer provided on the surface of the oxide layer and a porous layer provided on a surface of the dense layer.

[Configuration 2]

The cathode current collector according to the configuration 1, wherein an inorganic conductive layer comprising an inorganic conductive material is further provided between the oxide layer and the organic conductive layer, and the dense layer is provided on a surface of the inorganic conductive layer.

[Configuration 3]

The cathode current collector according to the configuration 1 or 2, wherein the surface of the cathode substrate is smooth.

[Configuration 4]

The cathode current collector according to any one of the configurations 1 to 3, wherein the porous layer has a thickness of more than or equal to 2 μm and less than or equal to 25 μm.

[Configuration 5]

The cathode current collector according to any one of the configurations 1 to 4, wherein the dense layer has a thickness of more than or equal to 0.02 μm and less than 15 μm.

[Configuration 6]

The cathode current collector according to any one of the configurations 1 to 5, wherein the porous layer has a porosity of more than or equal to 0.1 and less than or equal to 0.7.

[Configuration 7]

The cathode current collector according to any one of the configurations 1 to 6, wherein the organic conductive layer is an electrolytically polymerized film.

[Configuration 8]

The cathode current collector according to any one of the configurations 1 to 7, wherein the conductive polymer is poly(3,4-ethylenedioxythiophene).

[Configuration 9]

A cathode current collector comprising: a cathode substrate made of a valve metal; an oxide layer made of an oxide of the valve metal, the oxide layer being provided on a surface of the cathode substrate; and an organic conductive layer comprising a conductive polymer, the organic conductive layer being provided on a surface of the oxide layer, wherein the organic conductive layer consists of a dense layer provided on the surface of the oxide layer, and the organic conductive layer has a thickness of more than 2 μm and less than or equal to 22 μm.

[Configuration 10]

The cathode current collector according to the configuration 9, wherein an inorganic conductive layer comprising an inorganic conductive material is further provided between the oxide layer and the organic conductive layer, and the dense layer is provided on a surface of the inorganic conductive layer.

[Configuration 11]

The cathode current collector according to the configuration 9 or 10, wherein the surface of the cathode substrate is smooth.

[Configuration 12]

The cathode current collector according to any one of the configurations 9 to 11, wherein the organic conductive layer is an electrolytically polymerized film.

[Configuration 13]

The cathode current collector according to any one of the configurations 9 to 12, wherein the conductive polymer is poly(3,4-ethylenedioxythiophene).

[Configuration 14]

An electrolytic capacitor comprising the cathode current collector according to any one of the configurations 1 to 13, wherein the electrolytic capacitor comprises at least a solid electrolyte as an electrolyte component.

[Configuration 15]

The electrolytic capacitor according to the configuration 14, further comprising an electrolytic solution as the electrolyte component.

[Configuration 16]

An electrolytic capacitor comprising:
a cathode current collector having a cathode substrate made of a valve metal, an oxide layer made of an oxide of the valve metal, the oxide layer being provided on a surface of the cathode substrate, and an organic conductive layer comprising a conductive polymer, the organic conductive layer being provided on a surface of the oxide layer; and
at least a solid electrolyte as electrolyte component,
wherein the organic conductive layer is provided in close contact with the surface of the oxide layer, and the organic conductive layer has a thickness of more than 2 μm and less than or equal to 22 μm.

[Configuration 17]

The electrolytic capacitor according to the configuration 16, wherein the organic conductive layer consists of a dense layer provided on the surface of the oxide layer and a porous layer provided on a surface of the dense layer, or consists of a dense layer provided on the surface of the oxide layer.

[Configuration 18]

The electrolytic capacitor according to the configuration 16 or 17, wherein an inorganic conductive layer comprising an inorganic conductive material is further provided between the oxide layer and the organic conductive layer, and the organic conductive layer is provided in close contact with a surface of the inorganic conductive layer.

[Configuration 19]

The electrolytic capacitor according to any one of the configurations 16 to 18, wherein the surface of the cathode substrate is smooth.

[Configuration 20]

The electrolytic capacitor according to any one of the configurations 16 to 19, wherein the organic conductive layer is an electrolytically polymerized film.

[Configuration 21]

The electrolytic capacitor according to any one of the configurations 16 to 20, wherein the conductive polymer is poly(3,4-ethylenedioxythiophene).

[Configuration 22]

The electrolytic capacitor according to any one of the configurations 16 to 21, further comprising an electrolytic solution as the electrolyte component.

DESCRIPTION OF REFERENCE NUMERALS 1 cathode substrate
2 oxide layer
3 inorganic conductive layer
4 dense layer
5 porous layer
6, 9, 11 organic conductive layer
7, 8, 10, 12 cathode current collector

The invention claimed is:

1. A cathode current collector comprising:
a cathode substrate made of a valve metal;
an oxide layer made of an oxide of the valve metal, the oxide layer being provided on a surface of the cathode substrate; and
an organic conductive layer comprising a conductive polymer, the organic conductive layer being provided on a surface of the oxide layer,
wherein the organic conductive layer consists of a dense layer provided on the surface of the oxide layer and a porous layer provided on a surface of the dense layer, and
wherein the cathode current collector is not yet incorporated into a capacitor element.

2. The cathode current collector according to claim 1, wherein an inorganic conductive layer comprising an inorganic conductive material is further provided between the oxide layer and the organic conductive layer, and the dense layer is provided on a surface of the inorganic conductive layer.

3. The cathode current collector according to claim 1, wherein the surface of the cathode substrate is smooth.

4. The cathode current collector according to claim 1, wherein the porous layer has a thickness of more than or equal to 2 μm and less than or equal to 25 μm.

5. The cathode current collector according to claim 1, wherein the dense layer has a thickness of more than or equal to 0.02 μm and less than 15 μm.

6. The cathode current collector according to claim 1, wherein the porous layer has a porosity of more than or equal to 0.1 and less than or equal to 0.7.

7. The cathode current collector according to claim 1, wherein the organic conductive layer is an electrolytically polymerized film, and wherein the conductive polymer is poly (3,4-ethylenedioxythiophene).

8. An electrolytic capacitor comprising the cathode current collector according to claim 1, wherein the electrolytic capacitor comprises at least a solid electrolyte as an electrolyte component.

9. The electrolytic capacitor according to claim 8, further comprising an electrolytic solution as the electrolyte component.

10. A cathode current collector comprising:
a cathode substrate made of a valve metal;
an oxide layer made of an oxide of the valve metal, the oxide layer being provided on a surface of the cathode substrate; and
an organic conductive layer comprising a conductive polymer, the organic conductive layer being provided on a surface of the oxide layer,
wherein the organic conductive layer consists of a dense layer provided on the surface of the oxide layer, and the organic conductive layer has a thickness of more than 2 μm and less than or equal to 22 μm, and
wherein the cathode current collector is not yet incorporated into a capacitor element having a separator.

11. The cathode current collector according to claim 10, wherein an inorganic conductive layer comprising an inorganic conductive material is further provided between the oxide layer and the organic conductive layer, and the dense layer is provided on a surface of the inorganic conductive layer.

12. The cathode current collector according to claim 10, wherein the surface of the cathode substrate is smooth.

13. The cathode current collector according to claim 10, wherein the organic conductive layer is an electrolytically polymerized film, and wherein the conductive polymer is poly (3,4-ethylenedioxythiophene).

14. An electrolytic capacitor comprising the cathode current collector according to claim 10, wherein the electrolytic capacitor comprises at least a solid electrolyte as an electrolyte component.

15. The electrolytic capacitor according to claim 14, further comprising an electrolytic solution as the electrolyte component.

16. An electrolytic capacitor comprising:
a cathode current collector having a cathode substrate made of a valve metal, an oxide layer made of an oxide of the valve metal, the oxide layer being provided on a surface of the cathode substrate, and an organic conductive layer comprising a conductive polymer, the organic conductive layer being provided on a surface of the oxide layer; and
at least a solid electrolyte as electrolyte component,
wherein the organic conductive layer is provided in close contact with the surface of the oxide layer, and the organic conductive layer has a thickness of more than 2 μm and less than or equal to 22 μm, and
the organic conductive layer consists of a dense layer provided on the surface of the oxide layer and a porous layer provided on a surface of the dense layer, or consists of a dense layer provided on the surface of the oxide layer
wherein the electrolytic capacitor has a separator.

17. The electrolytic capacitor according to claim 16, wherein an inorganic conductive layer comprising an inorganic conductive material is further provided between the oxide layer and the organic conductive layer, and the organic conductive layer is provided in close contact with a surface of the inorganic conductive layer.

18. The electrolytic capacitor according to claim 16, wherein the surface of the cathode substrate is smooth.

19. The electrolytic capacitor according to claim 16, wherein the organic conductive layer is an electrolytically polymerized film, and wherein the conductive polymer is poly (3,4-ethylenedioxythiophene).

20. The electrolytic capacitor according to claim 16, further comprising an electrolytic solution as the electrolyte component.

* * * * *